(12) United States Patent
Howard

(10) Patent No.: US 7,219,908 B1
(45) Date of Patent: May 22, 2007

(54) STEER WHEEL CONTROL SYSTEM WITH STATIONARY PISTON AND RECIPROCATING CYLINDER

(76) Inventor: Durrell U. Howard, 306 Krameria Dr., San Antonio, TX (US) 78213

( * ) Notice: Subject to any disclaimer, the term of this patent is extended or adjusted under 35 U.S.C. 154(b) by 11 days.

(21) Appl. No.: 11/261,986

(22) Filed: Oct. 28, 2005

(51) Int. Cl.
*B62D 7/22* (2006.01)

(52) U.S. Cl. .................... 280/89.11; 74/495; 280/90

(58) Field of Classification Search .............. 280/89, 280/89.1, 89.11, 89.12, 89.13, 90, 93.501, 280/271, 272; 74/495
See application file for complete search history.

(56) References Cited

U.S. PATENT DOCUMENTS

| | | | |
|---|---|---|---|
| 2,509,570 A | 5/1950 | Lee | |
| 2,760,518 A | 8/1956 | Peet | |
| 2,862,722 A * | 12/1958 | Brueder | ................ 280/89 |
| 3,075,576 A | 1/1963 | Herbert | |
| 3,169,551 A | 2/1965 | Lewis | |
| 3,171,298 A * | 3/1965 | Henry-Biabaud | ............ 74/495 |
| 3,230,975 A | 1/1966 | Mercier | |
| 3,318,251 A | 5/1967 | Smith | |
| 3,426,612 A * | 2/1969 | Henry-Biabaud | ............ 74/495 |
| 3,730,307 A | 5/1973 | Mitchell | |
| 3,756,367 A | 9/1973 | Mitchell et al. | |
| 3,792,721 A | 2/1974 | Zahid | |
| 3,857,413 A | 12/1974 | Zahid | |
| 3,863,947 A | 2/1975 | Weston | |
| 3,870,335 A | 3/1975 | Schultz | |
| 3,882,953 A | 5/1975 | Maisch | |
| 3,882,954 A | 5/1975 | Inoue | |
| 3,887,027 A | 6/1975 | Allison | |
| 3,897,846 A | 8/1975 | Inoue | |
| 3,958,656 A | 5/1976 | Niemann | |
| 3,960,179 A | 6/1976 | Zahid | |
| 3,961,646 A | 6/1976 | Schon | |
| 4,008,782 A | 2/1977 | Chanal | |
| 4,088,154 A | 5/1978 | Patton et al. | |
| 4,349,079 A | 9/1982 | Lieber | |
| 4,359,123 A | 11/1982 | Haupt et al. | |
| 4,406,473 A * | 9/1983 | Sexton | ................ 280/89.11 |
| 4,410,193 A | 10/1983 | Howard | |
| 4,418,931 A * | 12/1983 | Howard | ................ 280/89.11 |
| 4,467,884 A | 8/1984 | Robertson et al. | |
| 4,503,678 A | 3/1985 | Wimbush | |
| 4,506,507 A | 3/1985 | Wimbush | |
| 4,534,577 A | 8/1985 | Howard | |
| 4,558,878 A | 12/1985 | Motrenec | |
| 4,566,712 A | 1/1986 | Motrenec | |
| 4,585,400 A | 4/1986 | Miller | |
| 4,588,198 A | 5/1986 | Kanazawa et al. | |
| 4,634,135 A | 1/1987 | Nakata et al. | |

(Continued)

*Primary Examiner*—Anne Marie Boehler
(74) *Attorney, Agent, or Firm*—Townsend M. Belser, Jr.; Nexsen Pruet Adams Kleemeier, LLC

(57) ABSTRACT

A steering system control apparatus having a centering unit for resisting off-center movement of the steer wheels of a vehicle and returning them to a selected center position after each such movement. A centering shaft is connected to the steering shaft of a vehicle steering gear for rotational reciprocation therewith and an intermediate rotational position thereof defines a neutral position that is remotely adjustable by a trimming unit to vary the selected center position of the steering system during vehicle operation. A holding force and a return force are applied to the centering shaft by a pressurized cylinder arranged for reciprocal movement relative to a stationary piston.

23 Claims, 10 Drawing Sheets

U.S. PATENT DOCUMENTS

| | | |
|---|---|---|
| 4,638,838 A | 1/1987 | Richard et al. |
| 4,669,567 A | 6/1987 | Nakamura et al. |
| 4,722,545 A | 2/1988 | Gretz et al. |
| 4,828,063 A | 5/1989 | Ogura |
| 4,872,486 A | 10/1989 | Sugimura et al. |
| 4,903,973 A | 2/1990 | Bray |
| 5,076,383 A | 12/1991 | Inoue et al. |
| 5,313,389 A | 5/1994 | Yasui |
| 5,527,053 A * | 6/1996 | Howard ............... 280/90 |
| 5,536,028 A | 7/1996 | Howard |
| 6,267,395 B1 | 7/2001 | Howard |
| 6,422,582 B1 | 7/2002 | Howard |
| 6,520,519 B2 | 2/2003 | Howard |
| 6,520,520 B2 * | 2/2003 | Howard ............... 280/90 |
| 6,817,620 B1 | 11/2004 | Howard |
| 2004/0056443 A1* | 3/2004 | Howard ............ 280/89.11 |

\* cited by examiner

STEER WHEEL CONTROL SYSTEM WITH STATIONARY PISTON AND RECIPROCATING CYLINDER

FIELD OF THE INVENTION

This invention relates to vehicle steering systems and more particularly to a device for holding the steer wheels of a motor vehicle, such as a motor home, bus, truck, automobile or the like, so that a center steering position is maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway motor vehicles and the like are designed primarily for driver control. In these systems, the steering force required on the steering wheel and the ratio between steering wheel movement and movement of the steerable ground wheels (also referred to herein as "steer wheels") depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

In the past, motor vehicle steering systems have provided some steering wheel returnability by slanting the king pins of the steer wheels so that their top ends are aft of their bottom ends. This is referred to as a positive king pin angle and produces a turning-lift effect that provides some steering wheel returnability as explained further below. The use of positive king pin angles involves compromises over the full steering spectrum because it results in positive caster offset and thereby produces castering of the steer wheels. For example, the adverse effects of strong gusty cross winds are more pronounced with large amounts of positive caster offset. As its name would imply, the vehicle tends to caster towards the side of the roadway to which it is being pushed by the wind. Thus, the adverse steering inputs caused by crosswinds are directly related to the amount of positive king pin angle, which is a classic example of having to balance a benefit with a detriment.

Any small amount of stability gained on a non-windy day from slanting the steer wheel king pins may be paid for many times over when driving in a crosswind because of the destabilizing castering effect of the crosswind. Similarly, a high crown at the center of the roadway or a slanted roadway tends to cause vehicles with castered steer wheels to turn toward the edge of the roadway, that is, in the downhill direction. Castered steer wheels also allow steering inputs from rutted and other imperfect roadway surfaces to steer back against the driver and thereby cause road wander, which is a universal driving complaint, particularly by drivers of heavy vehicles such as trucks and motor homes. In addition, due to increased turning-lift effects, generous positive king pin angles provide significant resistance to small radius turns, which can make city driving quite fatiguing. These adverse effects are some of the negative aspects of attempting to achieve steering system stability through generous amounts of positive king pin angle.

Another drawback of prior art steering systems is that spurious inputs transmitted from the roadway through the steer wheels affect substantially the entire steering assembly before encountering any stabilizing resistance from the steering wheel. The transmission of these inputs between the steer wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

For lack of a more advanced method, slanting of the steer wheel king pin has been accepted by the industry in the past as a low-cost method of achieving steer wheel returnability. Accordingly, many over-the-road vehicles are provided with generous amounts of positive caster offset. Not much thought has been given by others to the self-defeating side effects of steer wheel castering. Keeping a vehicle tracking straight and under control currently requires an inordinate amount of driver steering corrections to counteract the adverse side effects of castered steer wheels. The repetitive task of making numerous precise steering corrections mile after mile weighs heavily on a driver's physical and mental well-being, and may result in extreme driving fatigue. Thus, a highly important consideration that has long been overlooked by the industry is that steer wheel castering is directly responsible for road wander, crowned road steering wheel pull and cross wind steering problems. The failure of the industry to recognize the critical need to provide directional stability by replacing slanting of the king pins with another method of achieving steer wheel returnability may go down in history as one of the longest enduring vehicle design oversights.

My Precision Steer Wheel Control Technology (PSWCT) has brought to light incorrect technical assumptions that have been responsible for this long-standing major vehicle design oversight, which has in effect been responsible for a lack of heavy vehicle directional stability and related highway safety issues. The heavy vehicle industry has made amazing progress in advancing the state of the art in heavy vehicle design with the exception of recognizing the critical need for directional stability. For over a half a century, the driving of heavy vehicles that are lacking in directional stability has required an inordinate amount of corrective driver steering to keep the vehicle going straight and under control. To be directionally stable, a vehicle's steering system must be designed so that the steer wheels track exceptionally straight without requiring repetitive driver steering corrections to keep the vehicle under directional control, thereby greatly reducing the driver work-load. It has been shown that the industry-wide method of slanting the king pins of the steer wheels to achieve steering wheel returnability is the major cause of the unstable behavior of the steer wheels, which results in driver fatigue and a surprising number of other drivability and operational problems.

While this low-cost simple method of achieving steering wheel returnability is desirable from a manufacturing point of view, the resultant operational problems are very undesirable to the consumers, especially to the heavy vehicle drivers who must endure the million upon millions of miles that are many times more fatiguing to drive than they would be in a directionally stable vehicle that is not adversely affected by crosswinds. Historians will find it hard to rationalize how the hundred-year-old method of achieving steering wheel returnability by the "turning-lift effect" could have been used for so long, without steer wheel castering problems being recognized for their negative effect on heavy vehicle drivability. It was not for the lack of consumer complaints about the repetitive steering corrections required to maintain directional control in spite of road wander and steering wheel pull, about crosswind driving fatigue, and about the cost of accelerated steer wheel tire wear.

In fairness to the presently very capable heavy vehicle design community, the industry-wide endorsement of the long standing heavy vehicle steering and control methodology was established before their time, and had been universally accepted throughout the heavy vehicle industry as a cost-effective method of dealing with heavy vehicle steering requirements. Because the consumers' only choice has been to accept the lack of heavy vehicle directional stability and the related drivability problems as normal, other more pressing problems that the consumers were aware of were given priority over advancing the state of the art in heavy vehicle drivability.

Castering and the turning-lift effect may be further explained as follows with reference to prior art FIGS. 1 to 3. In the beginning when the horseless carriage first took to the road, uncomplicated simple technology was of great importance. As a product improvement, the steering tiller initially was traded for a steering wheel that presented a problem because the steering wheel would stay turned after turning a corner. The lack of steering wheel returnability was solved by the simple method of slanting the pivot axis A1 of a steer wheel king pin 2 aft at the top end to accomplish a turning-lift effect created when the steer wheel 3 was turned to the aft side of the slanted king pin, which moved the turning steer wheel downward by a small amount relative to the vehicle frame as illustrated by broken line 3' in FIG. 1. This downward wheel movement in turn lifted the vehicle frame (not shown) by the same small amount, which is represented by the lift height L1 between the arrows marked "Lift". When the vehicle driver releases the steering wheel after turning, the weight of the vehicle then causes the steer wheel that turned to the aft lower side of the slanted king pin and thereby lifted the vehicle, to return toward the lower most on-center driving position represented by the solid line steer wheel 3.

To better understand the turning-lift effect, a graphic example that almost everyone is familiar with is the post of a farm gate that becomes slanted with the passage of time due to the weight of the gate in its closed position. When the gate 10 is opened in either direction, the low end of the gate is lifted by turning it toward a non-slanting side of the post 9 on a pair of hinges 8,8, creating a turning lift effect as illustrated in prior art FIG. 2 by the broken line 11, which shows a turned position of gate 10, and the lift height L2 between the arrows marked "Lift". When the gate is released, its weight will cause it to swing back toward the lower closed position represented by the solid line gate 10 in FIG. 2. On either side near the gate's closed position, the turning-lift effect diminishes and becomes almost neutral such that its weight alone is not able to hold the gate in the fully closed position, requiring a suitable latch mechanism to keep it fully closed. In a similar manner to the turning lift of the farm gate, when the steer wheels of a vehicle return toward their lowermost on-center, straight ahead position, the turning-lift effect also diminishes and does not have enough centering force to keep the steer wheels tracking straight in the on-center driving position. Therefore, the unstable behavior of the steer wheels near the on-center position requires that they be constantly controlled by corrective driver steering input.

The inherent lack of steer wheel directional stability in the on-center driving position is made worse because the same slanted king pin angle that produces the turning-lift effect also produces a steer wheel castering effect that greatly adds to the unstable behavior of the steer wheels during crosswind and crowned road driving conditions. It is amazing that the adverse effect of steer wheel castering has failed to be better understood over the many years because of an original misleading choice of terms. It can be reasoned that in the beginning the shorter term, caster angle, was probably chosen over the more complex term, turning-lift angle, considering that the angles were one and the same.

For as long as anyone can remember, the standard reference for the required king pin angle in vehicle specification manuals has always been referred to in degrees of caster angle. Therefore, it is not surprising that it has been mistakenly assumed throughout the industry that steer wheel castering in some manner is beneficial to heavy vehicle drivability, when in fact the opposite is true. Accordingly, many of the text books and engineering papers that have been written about heavy vehicle steering geometry have repeated the mistaken assumption that castering the steer wheels makes a contribution to the directional stability of heavy over-the-road vehicles. Unfounded theories, attempting to explain how the castered wheel functions to make a vehicle directionally stable, have been repeated in various technical publications, greatly adding to the confusion.

It is also amazing how anyone whose desk chair has castered wheels, which allow the chair to move freely in any direction, could believe in some manner that, when applied to a highway vehicle, castering would keep the steer wheels tracking straight. Referring now to prior art FIG. 3, a castered wheel assembly 13 simply follows the lateral movement of a forward pivot axis A2 that is offset horizontally from a vertical axis A3 by a caster offset distance 6 between the arrows marked "Caster Offset". Axis A3 defines where a castered wheel 12 contacts the ground G, and arrow D3 indicates the direction of wheel rotation during forward lateral movement of wheel assembly 13. As applied to a highway vehicle, the pivot axis A1 of the slanted king pin 2 slants to intersect the ground G forward of where the steer wheel 3 contacts the surface of the ground as defined by a vertical axis A4. Axis A4 is offset horizontally from the pivot axis A3 by a caster offset distance 5 between the arrows marked "Caster Offset" in FIG. 1. Also in this figure, arrow D1 indicates the direction of wheel rotation during forward movement of steer wheel 3, arrow D2 indicates the direction toward which the wheel axle 7 rotates during a right turning movement of right front wheel 3, and 7', 2', 3' and A1' indicate the moved positions of the wheel axle, the king pin, the steer wheel and the king pin pivot axis, respectively, while the right turn is in progress.

A castered steer wheel therefore does not prevent lateral movement of a vehicle, which instead is actually guided by any force acting on the vehicle to cause lateral movement of the offset pivot axis A1. Therefore, during crosswind driving, the castered wheels of a heavy vehicle are guided down-wind by the lateral down-wind movements of the vehicle in response to crosswind gusts, thereby requiring repetitive driver steering corrections to maintain directional control of the vehicle. Crosswind driving is probably the most exhausting driving experience that heavy vehicle drivers must frequently endure because of the repetitive driver steering corrections required to keep the vehicle under control. Crosswind driving is therefore one of the major causes of driving fatigue and related heavy vehicle highway safety issues.

Heavy vehicle steer wheel footprint tests have been conducted using highly accurate instrumentation to measure and record steer wheel activity while driving. During the tests, experienced test drivers made a concerted effort to minimize the corrective steering input to only the amount required to maintain directional control. Any test data that was influenced by inadvertent driver over-steer was not used. Most of the test data was recorded at fifty five (55) miles per hour on a non-windy day on a smooth highway. Therefore, the data is considered to represent a best-case scenario.

According to the test data taken at fifty five (55) miles per hour, the left and right driver steering inputs required to correct the unstable behavior of the steer wheels varied from the on-center position thirty-five to forty thousandths (0.035-0.040) of an inch. When the test driver held the steering wheel steady instead of making the left and right steering corrections required to keep the vehicle directionally under control, the vehicle would make an undesired lane change when the steer wheels were off-center by thirty-five thousandths (0.035) of an inch. When the vehicle speed was increased to sixty-five (65) miles per hour, it only required the steer wheels to be directionally off-center fifteen to eighteen (0.015-0.018) thousandths of an inch to make an undesired lane change. During adverse road and wind conditions, the tests also demonstrated that the unstable steer wheel activity increased substantially, requiring a corresponding increase in driver steering inputs to maintain directional control.

The ideal driving situation is therefore one where the steering system inherently causes the vehicle to travel in an unswerving straight line unless the driver intentionally turns the vehicle in another direction. The ideal steering system should therefore require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steer wheels, and significantly reduces driver fatigue because it results in a major reduction in driver steering inputs. The invention also eliminates the need for positive caster offset by providing directional stability of steer wheels with no positive caster, i.e., a caster angle of zero degrees (0°). Thus, on-center tracking of the steer wheels is achieved by a means that does not have the deficiencies inherent in positive caster offset and that substantially reduces the need for corrective steering inputs from the vehicle driver.

The positive on-center feel of such a directionally stable vehicle provides a new level of drivability for motor vehicles, including automobiles, trucks, buses, campers and motorized homes. The invention thus achieves new levels of directional stability and drivability, which reduce driver fatigue to a level that cannot be achieved by conventional positive caster centering. When a driver turns the steering wheel of modern over-the-road vehicles, power steering does the work. If these vehicles utilize the present invention and the steering wheel is released, the centering control system goes to work and makes the steered wheels track straight with great accuracy by counteracting spurious steering inputs as described below.

The centering unit section of the centering assembly includes a component that moves with the steering system in response to steering wheel movement, and resistance to movement of this component provides a resistance force opposing very small movements (preferably less than 0.001 inch, more preferably less than 0.0005 inch) of the steer wheels to either side of their center position. Small steer wheel movements in the range of 0.015 to 0.040 inch correspond to the very large radius turns that occur when a vehicle is steered through lane change maneuvers at highway speeds. Thus, during large radius turns, the centering unit provides a centering force that returns the steer wheels back toward their on-center position upon removal of the steering force producing the large radius turn.

The manner in which the present invention accomplishes the foregoing improvements and advantages will now be described. The resistance force is provided by a zero backlash centering assembly that is preferably attached at one end to a fixed frame member and at the other end either to the steering gear pitman arm or directly to the steering system tie rod. The assembly comprises a movable centering cylinder arranged for reciprocation within a housing and cooperating with a fixed (stationary) centering piston to define a centering chamber. The cylinder has an on-center rest position in which it is pressed against actuating rollers rotatably mounted on opposite supporting arms of a support member that is carried at its center for pivotal movement by an input shaft that is itself rotatably mounted for pivotal movement in response to a centering lever connected to a vehicle steering system.

The input shaft via its lever are connect to the Pitman arm or the tie rod of the vehicle so as to translate linear tie rod movement into pivotal movement of the supporting arms, which in turn cause the rollers on one of the opposite arms to press against an abutting end surface of the centering cylinder and thereby generate a compressive movement of this cylinder. The centering chamber may be pressurized by either a gas or a liquid and this fluid pressure resists linear movement of the centering cylinder and turning movement of the usual pair of front steered wheels, which are connected together by a conventional tie rod for steering movement therewith.

When the steered wheels are turned away from center in one direction by the driver rotating the steering wheel in a corresponding direction, the centering cylinder is displaced by the rollers mounted on a corresponding one of the centering arms, and when the steered wheels are turned away from center in the opposite direction by the driver rotating the steering wheel in the opposite direction, the centering cylinder is displaced by the rollers mounted on the opposite centering arm. In either case, when the driver releases the steering wheel, the displaced centering cylinder returns to its on center rest position against the centering rollers of both centering arms, and this return movement causes the steering system to also return to its on-center position.

The fluid pressure source may utilize either a gas, such as air (pneumatic), or a liquid, such as hydraulic fluid. The fluid pressure source is preferably used to maintain a substantial pressure in the centering chamber at all times during normal operation so that this pressure will cause the bearing surface of the centering cylinder to be firmly pressed continuously and simultaneously against the rollers of both support arms to keep the steered wheels on center, tracking with an accuracy that is not achieved with any methods other than those of applicant's prior disclosures in this field. The preferred gas pressure source utilizes gas pressure from an existing pressurized gas source, such as an onboard air tank or compressor, a vehicle airbrake system or some other conventional air pressure source. The preferred hydraulic pressure source utilizes a gas over hydraulic pressure accumulator that includes a reservoir for the hydraulic fluid. Gas pressure from a conventional air pressure source, such as mentioned above, may be used to charge a gas pressure chamber on one side of a flexible accumulator wall having a liquid pressure chamber on the opposite side of the piston.

By selecting different fluid pressures supplied to the centering chamber of the centering unit, the resulting resistance forces applied to the centering rollers by the bearing surface of the centering cylinder may be varied, thereby permitting selection of the resistance to off-center movement of the steering system, as well as the return force for recentering the steering system. The resistance and return forces selected will depend on the particular characteristics of the vehicle on which the steering control system is installed. A pressure relief valve may also communicate with the centering chamber to provide an upper limit to the resistance and return forces that may be generated by contact between the centering cylinder and the respective centering rollers. Although one roller at each end of the support member would suffice, preferably a pair of centering rollers are rotatably mounted on the distal end of each of the opposite arms of the pivotal roller support member.

Because the centering lever of the centering unit is connected to a conventional steering lever known as the "Pitman arm", and fluid in the centering chamber is pressurized by a pressure source, the centering cylinder can not move away from its rest position corresponding to the centered position of the steering system until a steering force exceeds the on-center holding force dependent on centering chamber pressure and the size of the area of the pressure face of the stationary centering piston, which corresponds to the cross-sectional area of the centering cylinder. The level of steering force required to overcome this steer wheel holding force and thereby initiate a steering movement away from center is sometimes referred to in this specification as the "on-center holding force" or "the breakaway steering force". Different levels of on-center holding force may be appropriate to compensate for different vehicle weights and/or adverse unstable behavior of the steer wheels that the steering geometry does not control or prevent.

When a pressing force applied by the centering rollers in response to the steering force is sufficient to overcome the on-center holding force, the centering cylinder moves away from its on-center rest position and, during this compressive movement, it is continuously biased back toward its rest position by centering chamber pressure. Thus, a centering force resists relative movement between the movable centering cylinder and the stationary centering piston. This resistance to relative movement between these members prevents any substantial movement of the steer wheels or other steerable member(s) away from their selected center position until the steering force applied to the steering system by the steering wheel exceeds a predetermined value corresponding to the level of on-center holding force provided by the centering unit. The centering chamber pressure also produces a constant contact pressure between the centering cylinder and each centering roller when the components of the centering unit and the steering system are in their on-center positions, thereby preventing any significant slack between these components.

The invention also includes a trim assembly that allows small adjustments to be made in the center position of the steering system to fine tune steering of the vehicle. For this purpose, a remotely operable trimming unit is provided for controllably varying the selected center position of the steerable member to be maintained by the control system. In particular, the trimming unit includes a trim rod connected to a trim piston arranged for movement in either direction within a hydraulic trim cylinder. The distal end of the trim rod is pivotally connected to a component of the steering system, preferably the Pitman arm, and the distal end of the trim cylinder is pivotally connected to the centering lever of the centering unit, the housing of which is fixed to a stationary component of the vehicle frame.

Thus, the trimming unit provides a linkage of adjustable length between the steering system and both the centering unit and the vehicle frame on which it is mounted. Liquid trim fluid from an internal reservoir within the trimming unit, or from an external reservoir within a separate accumulator, is supplied to respective trim chambers on opposite sides of the trim piston. Trim fluid flow to and from the trim chambers is controlled by a trim valve located within an intermediate head of the trimming unit and operated by a single trim solenoid to allow a movement of the trim piston and its rod that changes the length of the linkage between the steering system and the frame-mounted centering unit and thereby the center position of the steering system and the steered wheels connected thereto.

The trim unit is separate from the centering unit, but these two units are connected by either the trim piston or the trim cylinder, preferably the latter. The trim piston preferably can move about one-half inch to about one inch to either side of its center position in the trim cylinder, i.e., the total stroke of the trim piston is preferably in the range of about one inch to about two inches. The hydraulic fluid in the trim cylinder is trapped on opposite sides of the trim piston by the trim valve when it is closed, creating a hydraulic lock that holds the trim piston in a selected on-center position relative to the trim cylinder. When an electric trim button is activated, the solenoid operated trim valve opens, allowing fluid to pass from one side of the trim piston to the other. This causes the trim piston to move in the trim cylinder precisely by the amount necessary to coincide with the straight ahead direction that the vehicle is being steered. Releasing the trim button allows the trim valve to close, recreating the hydraulic lock in the trim cylinder to hold the centering assembly in the new on-center position to which it has been trimmed.

The average trim corrections may be on the order of a few one-thousandths of an inch. Such fine tuning of the on-center directional stability makes driving more pleasurable and less fatiguing. The steering control system of the invention thus comprises a centering unit having a center position that is adjustable to permit the on-center position of the steering system to be changed and reset (trimmed) to compensate for any change in the on-center trim condition that would otherwise cause the vehicle to deviate from its straight ahead course. Such "trimming" adjustments are made remotely to permit the center position maintained by the centering assembly to be fine tuned while the vehicle is in operation from a location near the driver, which is "remote" relative to the location at which the centering unit is connected to the steering system of the vehicle. Therefore, the driver easily trims out steering wheel pull by the simple touch of a trim switch.

A liquid trimming fluid is preferred because it is substantially incompressible as compared to a gaseous trimming fluid and therefore provides the capability of locking the trim piston in its trimmed position without appreciable slack. With only an incompressible liquid in the trim valve assembly and in the trim chambers, closure of the trim valve creates a hydraulic lock that holds the steering system in the trimmed on-center position with zero backlash. Where a remote reservoir is utilized for supplying hydraulic trim fluid, the hydraulic line between this reservoir and the trim cylinder is preferably made of a material that is non-expandable, i.e. non-stretchable, both laterally and longitudinally so that the internal volume of this line does not change with changes in internal pressure. Changes in volume with changes in pressure are undesirable because such volume changes may cause undesirable movement of the trim piston within the trim cylinder. For this reason, it is preferable to incorporate the hydraulic fluid reservoir internally within the trim cylinder, as shown and described below for one embodiment of the invention.

The centering chamber may be pressurized by either a gas or a liquid, either of which may be pressurized by an air supply system of the vehicle. In a preferred embodiment shown and described in detail below, the centering chamber is pressurized directly by a gas, such as air. In another embodiment also shown and described in detail below, the pressurizing centering fluid is provided by a combination hydraulic fluid and gas pressurization system wherein a hydraulic fluid system is pressurized by an accumulator having a liquid reservoir and a gas chamber for pressurizing the liquid reservoir.

Regardless of the type of fluid pressurization system employed, the system should generate sufficient centering fluid pressure to return the centering cylinder to its rest position upon cessation of intentional steering inputs. Spurious steering inputs tending to move the tie rod in either direction are therefore resisted by a corresponding on-center holding force generated by fluid pressure acting against the centering cylinder via its corresponding centering chamber. Only when intentional steering wheel forces exceed a preselected on-center holding force level will the pitman arm of the steering system generate sufficient linear force on the centering lever to move centering cylinder away from its rest, on-center position.

A driver control panel facilitates making centering trim corrections while driving the vehicle. The panel may be conveniently located near the driver and provides at least two basic functions, namely, a switch to turn the system on and off, and a momentary trim switch. Activating, adjusting and trimming the centering system is therefore an easy and natural driving function. Should the driver observe any amount of left or right steering wheel displacement required to keep the vehicle tracking straight it is then easily eliminated by pressing the trim switch. This switch preferably has a toggle that is biased by a spring to the circuit opening position. These types of switches are closed only momentarily when the toggle is held in a depressed position against the spring bias. Thus, the solenoid of the trim valve is actuated only while the toggle is actually depressed. Release of the toggle opens the circuit and stops the trimming adjustment at the point selected.

Optionally, the control panel may also include a fluid pressure gauge and a gas pressure regulator connected between the gas chamber and an onboard compressed gas system that permits the level of resistance to movement away from center and the level of return force to be controllably varied by hand adjustment of a control knob on the regulator. Therefore, the level of resistance to movement away from center may be remotely adjusted by a manual control system operable by the driver. As a further alternative, the regulator control may be driven by a solenoid or reversible electric motor responsive to a microprocessor control system for controlling centering system pressure in response to the output of a vehicle speed sensor. Thus, the on-centering force of the present invention may be readily adjustable to provide a low level at lower speeds and a high level at higher speeds, such as above about 35 mph.

The system parameters may be chosen so that a total on-center holding force of at least 100 pounds, preferably at least 200 pounds, and more preferably at least 300 pounds must be applied to the tie rod in order to overcome the on-centering holding force of the steer wheels at vehicle speeds above about 35 miles per hour. For city driving at vehicle speeds of about 35 miles per hour or less, the on-center holding force may be eliminated by turning off the control system at the control panel or, if using a remotely adjustable centering pressure option, the holding force may be lowered to about 100 pounds, more preferably below about 50 pounds, at the tie rod. The centering unit for powered steering systems may be left on continuously because it will automatically turn off with the ignition and come back on when the engine is started. With any malfunction of the vehicle's power steering, an automatic disabling feature may be provided to shut the system completely off.

The centering unit overrides spurious inputs to the steering system of vehicles with positive caster offset so that constant manipulation of the steering wheel by the driver is no longer required to hold the vehicle on a true straight ahead course. When used on steering systems with zero caster offset or with negative caster offset, the invention provides the driver with a positive touch control not heretofore attainable with those types of systems. Positive stability is thereby achieved for otherwise marginally stable or previously unstable steering systems. The invention also provides a distinctive feel when approaching or leaving the center position. Thus, the sense of touch is added to the visual sense to aid control of the vehicle and reduce driver fatigue. The on-center holding force selected should satisfy the road feel desired by the driver and be sufficient to overcome anticipated spurious inputs.

The control system is useable with both power and non-powered steering systems, with the level of centering forces provided usually being less for vehicles without power steering. The invention may be used on steering systems with or without a reduction gear between the steering wheel and the steer wheels. In the former application, the centering unit is preferably connected to the steering system at a location between the steer wheels and the reduction gear, such as to the pitman arm as mentioned above, so as to be unaffected by any slack in the reduction gear or in components and connections between the reduction gear and the steering wheel. It is therefore preferably installed on the slow side of the reduction gear ratio in order to provide a zero backlash centering unit. The invention is particularly advantageous for large over-the-road motor vehicles, where its use may reduce tire wear by as much as fifty to seventy percent (50-70%) by preventing oscillations of the steer wheels due to steering system geometry and/or driving conditions.

The centering assembly of the control system is preferably connected between the steering system and a nearby frame member of the vehicle in a position that allows the steerable member to move through its full range of steering movements while providing sufficient leverage for the assembly to resist movement of the steerable member away from the center position producing straight ahead travel of the vehicle. The steering system connection may be made to any steering system component providing appropriate range and leverage, such as the tie rod joining the two front steer wheels of a highway vehicle, or the Pitman arm connected to the reduction gear, or the drag link connecting the tie rod to the Pitman arm. The frame connection may be made to an axle, a rail or any other frame component serving as a fixed mounting relative to the movable components of the steering system. This fixed component also may be some other part fixed to the vehicle frame instead of an actual frame member.

Although the present invention is particularly useful as a centering mechanism for the steering systems of motor vehicles, it can be employed to position any steerable member moveable to either side of a preselected position. For example, the control system could keep a boat motor centered so that a boat follows a straight course over the water in the presence of spurious steering forces produced by wind and wave action. The control system can also be used to center such steerable members as the rudders of ships or airplanes and the tongues of tandem trailers or railway cars.

From the consumers' point of view, the present invention, as well as my prior disclosures of PSWCT, solves a number of over-the-road heavy vehicle operational problems, and the cost of its installation may more than be paid for by the savings in steer wheel tire expense alone because it provides precision steer wheel control that greatly reduces or substantially eliminates excessive steer wheel tire wear. These results are achieved because my PSWCT prevents the steer wheels from castering, thereby alleviating or eliminating the drivability problems that have been caused by steer wheel castering. The system also makes the steer wheels track straight by returning them to and/or holding them in their true centered position, thereby doing away with the unstable behavior of the steer wheels that is inherent to the hundred-year-old farm gate turning-lift technology. The present invention thereby accomplishes one or more of the following improvements in steer wheel control:

(a) advances the state of the art in heavy vehicle directional stability by keeping the steer wheels tracking straight with a high level of precision, greatly reducing the repetitive driver steering input required to maintain directional control, and thereby doing away with long overlooked steering wheel adverse ergonomics problems and making a major reduction in driving fatigue;

(b) achieves relatively easy vehicle controllability during steer wheel tire blowout, and therefore avoids the need for the usual steering wheel fight;

(c) makes a considerable improvement in crosswind drivability by preventing the steer wheels from downwind caster steering in response to wind gusts, thereby making a major reduction in crosswind driving fatigue;

(d) provides heavy vehicle directional stability that greatly reduces the potential for driver over-steer that can easily start an over-steer chain reaction of the type responsible for many loss-of-control highway accidents, and thereby also makes driver training safer and less costly;

(e) significantly reduces or substantially eliminates road wander that is caused by the unstable behavior of the steer wheels that conventional steering geometry does not control or prevent;

(f) does away with steering wheel pull on crowned or slanted roads that is caused by steer wheel caster steering to the low side of the road;

(g) substantially reduces related heavy vehicle accident potentially by reducing driving fatigue;

(h) makes team driving safer because the driving is easier and less fatiguing to the on-duty driver and the off-duty driver gets more rest and sleep due to the non-swaying, directionally stable ride;

(i) makes trucks pulling multiple trailers much less fatiguing and safer to drive, and also much easier for other vehicles to share the highway with because the trailers stay in line with the non-swaying, directionally stable truck; and, (j) provides a solution to the costly steer wheel tire wear problem that has long been an added expense to heavy vehicle operators.

The invention thus greatly reduces tire wear of the steer wheels. Tests of my PSWCT suggest improvements in steer wheel tire service life for over-the-road heavy vehicles in the range of about fifty-five percent to about seventy percent. Heavy vehicles using this technology have exhibited a smooth, non-cupping steer wheel tire wear pattern instead of the costly irregular wear pattern of the past. Unlike the puzzling steer wheel tire wear problem that has perplexed the heavy vehicle industry for years on end, the explanation of how my PSWCT solves the problem is uncomplicated and easy to understand. First, the costly irregular tire wear pattern only occurs on the front steer wheels due to the unstable behavior inherent in conventional steering geometry. Second, when this unstable behavior of the steer wheels is prevented by my PSWCT, these wheels are made to track in a directionally stable manner with the same precision as the wheels on the nonsteering rear axles. Therefore, the tires have the same smooth wearing tread and the same normal extended service life as those on the fixed non-steering rear axles.

BRIEF DESCRIPTION OF THE DRAWINGS

The invention, including its structure, assembly and operation, may be further understood by reference to the detailed description below taken in conjunction with the accompanying drawings in which.

DETAILED DESCRIPTION OF THE INVENTION

Figure 1:
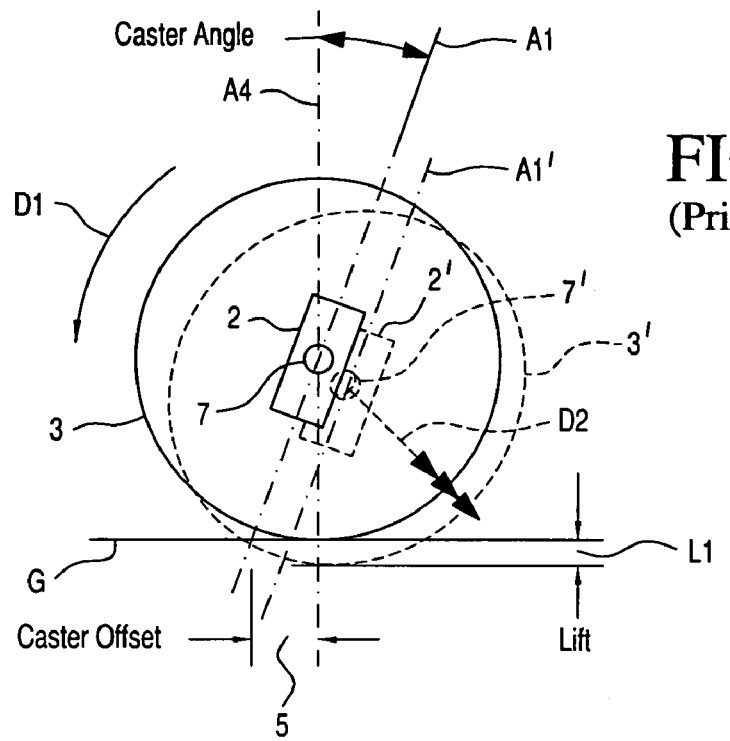
FIG. 1 illustrates the turning of a prior art steer wheel with positive caster.
Figure 2:
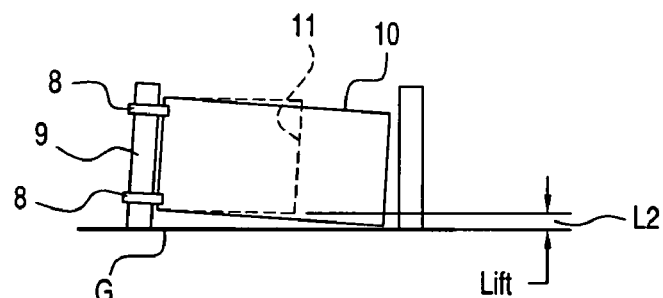
FIG. 2 illustrates the opening of a prior art roadway gate hinged on a slanted post.
Figure 3:
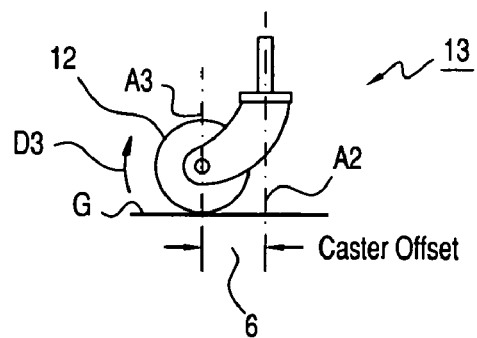
FIG. 3 illustrates a prior art caster wheel.
Figure 4:
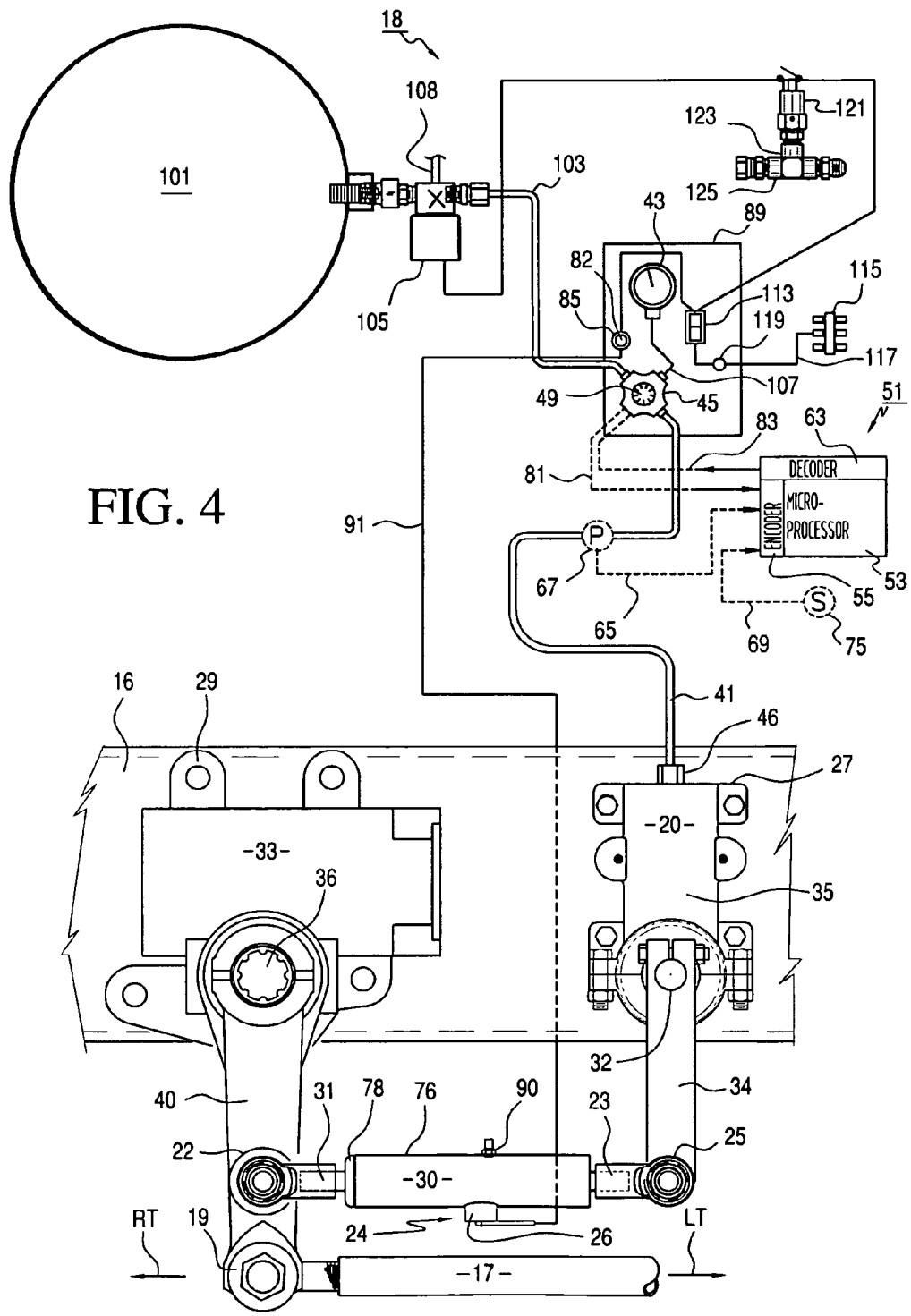
FIG. 4 is a schematic drawing illustrating installation of the centering assembly of the invention between a frame member and steering system components of a motor vehicle, and includes a diagram of the fluid and electrical systems of the assembly.

Referring to FIG. 4 of the drawings, the precision steer wheel control system of the present invention comprises a steer wheel control system, generally designated 18, which includes a centering unit 20 and a trimming unit 30 that form a composite assembly that may be connected between a frame rail 16 and a steering lever or Pitman arm 40 of a conventional motor vehicle. Steering inputs by the driver are transmitted to the vehicle tie rod (not shown) by a drag link 17 and the Pitman arm 40, which pivots in response to a steering shaft 36 of a conventional steering gear within a housing 33. The distal end of a centering lever 34 of centering unit 20 is connected to the Pitman arm 40 by means of the trimming unit 30, which has a cylinder rod 23 connected to lever 34 by a ball joint 25 and a trim piston rod 31 connected to the Pitman arm 40 by a ball joint 22. The steering gear housing 33 and a housing 35 of the centering unit 20 are both mounted on the frame rail 16 by bolts that pass through housing lugs 29 and 27, respectively.

Figure 5:
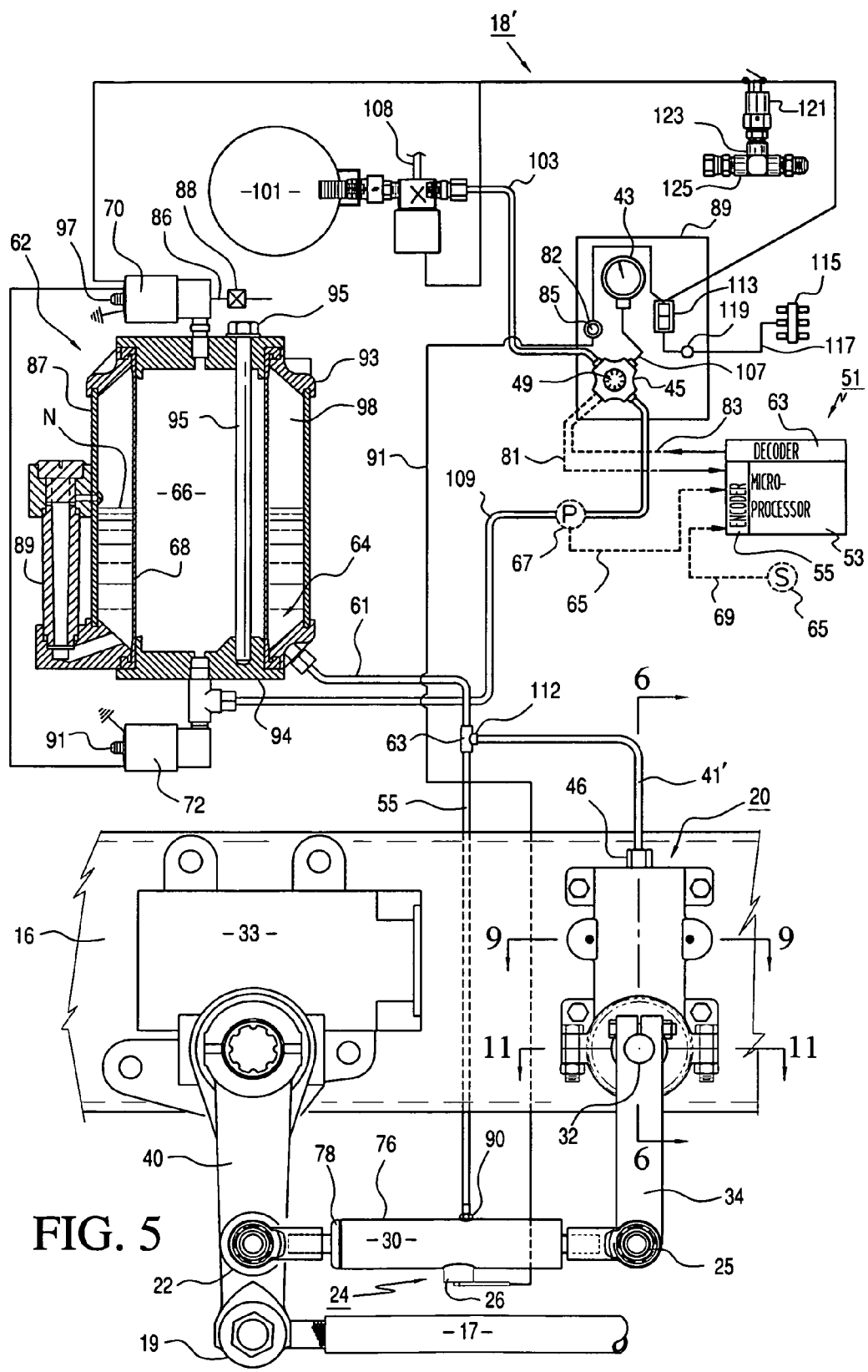
FIG. 5 is a schematic drawing similar to FIG. 4 illustrating a modification of the fluid system of the centering assembly of the invention.
Figure 6:
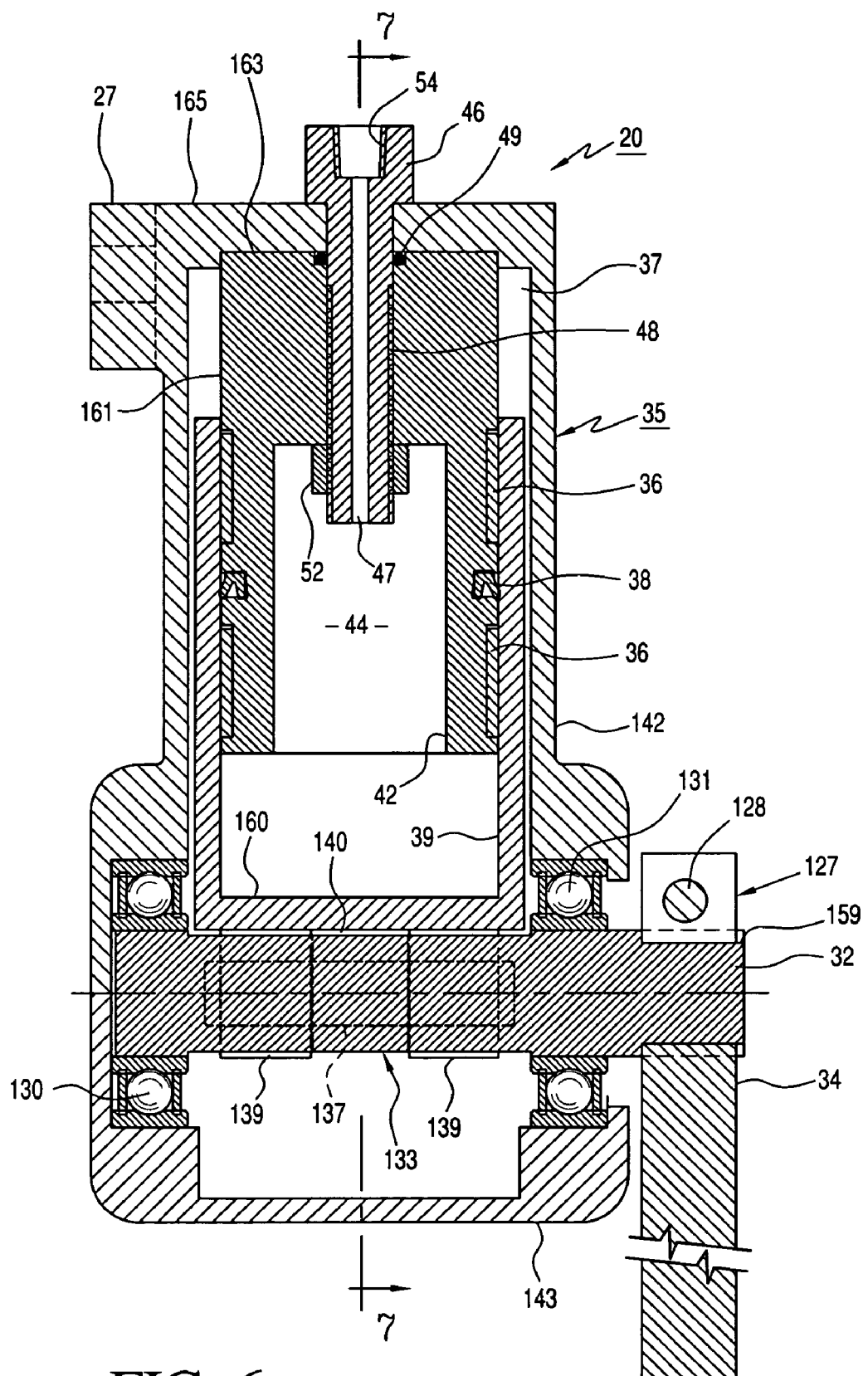
FIG. 6 is an enlarged elevational view of the centering unit in section taken along lines 6-6 of FIG. 5.

Centering lever 34 has a proximate end connected to a centering shaft 32, which is mounted for pivotal rotation in centering unit housing 35 by a pair of shaft bearings 130 and 131 (FIG. 6). Centering lever 34 is secured to centering shaft 32 for rotation therewith by a clamping portion 127 having opposing ears clamped around splines 159 on the distal end of shaft 32 by a bolt 128. As described in detail below, the internal components of the centering unit 20 cause the centering lever 34 to resist pivotal movement of the Pitman arm 40, and thereby resist a turning movement of the steerable wheel(s), in response to fluid pressure supplied through a fluid port 46 leading to a centering pressure chamber 44 within the centering unit. The chamber 44 may be pressurized by a gas, such as air, as shown in FIG. 4, or by a liquid, such as hydraulic fluid, as shown in FIG. 5.

The major components of the steering control system and the way in which they center and stabilize a vehicle steering system will now be described. It is to be understood that the components described are connected together by appropriately sized fluid conduits and electrical wires and that these conduits and wires are represented by the lines interconnecting the components as shown in FIGS. 4 and 5. The centering unit 20, through the trim unit 30 and the lever-like Pitman arm 40 and its connecting steering linkages, provides a resistance force as described below for resisting movement of the steer wheels (not shown) away from a selectable center position. The level of this resistance force is adjustable and is dependent upon the amount of fluid pressure supplied to the centering chamber 44 (FIG. 6) in the centering unit 20 via a fluid conduit 41 as shown in FIG. 4. The center position is selectable because the overall length of the trim unit 30 is remotely adjustable as also described below.

The resistance fluid may be a gas and the gas pressure control may comprise a manual throttle valve (not shown) in conduit 41, in combination with a pressure gauge 43 to indicate the gas pressure. Alternatively, a pressure regulator 45 may be used for maintaining a manually selected centering system pressure. A selector knob 49 is provided to permit varying the pressure settings of the regulator by hand. By varying the gas pressure in centering chamber 44 by adjustments to pressure regulator 45, the break-away resistance and the centering return force produced by the centering unit can be increased or decreased as desired. The pressure gauge and the regular may be mounted on a control panel 89, preferably located at or near the driver's station of the vehicle. The range of pressures available should be selected so that break-away resistance can be varied from relatively low at low speeds to relatively high at high speeds.

Pressure regulator 45 is connected to a compressed gas source 101, such as an onboard air tank or compressor, via a conduit 103 containing a solenoid operated three-way valve 105. The gas pressure in chamber 44 is indicated by the pressure gauge 43, which is connected to pressure regular 45 by a conduit 107. The gas is preferably air, although nitrogen or other non-flammable gases may be used. The electrical components of the control system are activated by an on-off switch 113, which is connected to an electrical bus 115 by a line 117 containing a circuit breaker 119.

As it is best to deactivate centering unit 20 in the event of a failure of the power steering system, a switch 121 for interrupting electrical power to the solenoid valve 105 may be provided for vehicles with power steering systems. Switch 121 is mounted on a pressure sensor 123 located in a hydraulic line 125 in fluid communication with the outlet of the vehicle's power steering pump (not shown). A loss of pressure at the pump outlet causes switch 121 to open, thereby causing gas supply valve 105 to close off pressure source 101 and dump air from centering chamber 44 and lines 41 and 103 to ambient via exhaust line 108 in the absence of electrical power to its solenoid. Pressure regulator 45 may be designed to permit such reverse flow from chamber 44 and line 41. Alternately, valve 105 and line 108 may be placed in line 41 instead of line 103.

As an alternative to manual adjustment, the output pressure of regulator 45 may be adjusted by a reversible electric motor (not shown) controlled by an on-board computer 51, which comprises a microprocessor 53, an encoder 55 and a decoder 63. Encoder 55 converts to digital signals an analog signal 65 input from a pressure sensor 67 in the gas supply conduit 41, an analog signal 69 input from a vehicle speed sensor 75, and an analog signal 81 input from a position sensor (not shown) within regulator 45. Decoder 63 converts digital control signals generated by microprocessor 53 to an analog signal 83 for controlling the reversible electric motor to make adjustments in the output pressure provided by regulator 45. The gas pressure in gas chamber 44 and the resulting resistance and centering forces are thereby made automatically responsive to the speed of the vehicle to provide a "speed sensitive" centering force to the vehicle's steering system. It may be desirable in some applications that the resistance to turning movements away from the center position be increased automatically as the speed of the vehicle increases because the effects of small off-center movements in response to spurious steering inputs increase dramatically with vehicle speed.

The trimming unit 30 includes a trim cylinder 77 and a trim piston 116 (FIG. 13), which together define a pair of opposing trim chambers 139 and 146 that are pressurized by a liquid supplied from a liquid pressure source. In the embodiment of FIG. 4, the liquid pressure source is an internal reservoir chamber 71 that is pressurized by a piston 69 pressed inward within a cylinder 73 by a compressed spring 74. A Schraeder valve 226, similar to those used to adjust the air pressure in the tires of motor vehicles, may be used to charge reservoir 71 with a pressurized liquid that in turn compresses spring 74 to store the energy required for transferring this liquid between the trim chambers. A solenoid valve 24 opens in response to a driver of the vehicle pushing a trim button 85, which is on the control panel 89 and electrically connected to the valve's solenoid 26 by a line 91. Actuation of the solenoid valve 24 to its open position by pushing the trim button allows an otherwise static trim piston 116 to move, thereby permitting a change in the centered position of the Pitman arm 40 as maintained by the centering unit 20, and a corresponding change in the center position of the steer wheels as explained further below.

Thus, the components mounted on the driver control panel 89 make it possible for the driver to make needed steering corrections while driving the vehicle. Should the driver sense a degree of steering wheel pull that becomes a bother, it is then quickly eliminated by pressing the trim button 85. This button actuates an electrical trim switch 82 that preferably has a toggle design in which button 85 is spring-biased to a circuit-open position. Such switches are closed only momentarily when the toggle button is held in a depressed position against the spring bias. On the other hand, a valve element 222 of valve 24 is spring-biased to close this valve when solenoid 26 is not actuated. Thus, the trim adjusting solenoid 26 is actuated to open valve 24 only while the toggle button 85 is depressed. Release of the button opens the circuit allowing the spring-biased valve element to reclose, and stops the trim adjustment at the point selected.

In an alternative control system embodiment 18' shown in FIG. 5, a pressurized liquid is supplied as the centering fluid to the centering chamber 44 via an accumulator line 61, a tee 63, a centering fluid conduit 41', and fluid port 46 of the centering unit. The tee 63 may also optionally contain a flow restriction orifice 112 for enhancing vehicle control in the event of a tire blow out. A pressurized trim liquid may also be supplied to the trim chambers 139 and 146 via the accumulator line 61, the tee 63, a trim fluid conduit 55, and a conduit coupling compatible with port fitting 90, this coupling being used in place of the Schraeder air valve 226 in the fitting 90. The accumulator 62 has an annular liquid chamber 64, a central gas chamber 66 separated from the liquid chamber by a flexible bladder 68, and solenoid operated upper and lower gas dump valves 70 and 72. A liquid trim fluid is preferred because it is substantially incompressible as compared to a gaseous trimming fluid and therefore provides the capability of locking the trim piston in the selected trimmed position without appreciable slack.

Bladder 68 is preferably made of neoprene. Accumulator 62 also includes an upper head 93 and a lower head 94 spaced apart by an outer housing wall 87 and secured together by peripherally spaced bolts 95, only one of which is shown in FIG. 5. Gas chamber 66 may be connected by a line 109 to the same compressed gas source as air line 41 in FIG. 4. Thus, the gas pressure in chamber 66 is indicated by the pressure gauge 43 and is controlled by the pressure regulator 45. Both the bladder 68 and the surrounding housing wall 87 of accumulator 62 are preferably cylindrical.

Preferably, centering unit 20, trim unit 30 and accumulator 62 are positioned and arranged relative to each other such that any gas bubbles in the trim and centering chambers flow back into the liquid reservoir 64 of the accumulator via the inlet and outlet line 61. Upon entering accumulator 62, the gas bubbles will rise to the liquid and gas interface N such that the gas accumulates in an upper portion of liquid reservoir 64 where it provides a gas cushion 98, which may serve the same purpose as the pressurized gas in chamber 66. Gas chamber 66 should be large enough for liquid chamber 64 to receive the entire volume of fluid from centering chamber 44 without unduly collapsing bladder 68. A bleed passage 86 containing a normally closed vent cock 88 allows liquid chamber 64 to be partially filled with hydraulic fluid up to the level of the top of a filler neck 89.

Gas pressure in chamber 66 acts through bladder 68 to store fluid energy received from the hydraulic side of the system, and to maintain fluid pressure on the liquid side of the centering cylinder 39 and on both sides of trim piston 116 until such time as the gas pressure is released to ambient atmosphere by actuation of dump valves 70 and 72 in response to turning off the system with the on-off switch 113. Accumulator 62 allows hydraulic pressure in the centering chamber 44 to be precisely varied over a relatively wide range because the gas trapped in gas chamber 66 provides a spring-like return force and this chamber may be sized such that the return force does not vary significantly with compressive movement of cylinder 39.

The air pressure in the accumulator 62 is automatically recharged each time the system is turned on, thereby eliminating a recharge maintenance function. When the system is turned off, the lower dump valve 72 opens and includes a drain line 91 that has the dual purpose of discharging both gas and any liquid (such as condensed water) accumulating in gas chamber 66. A pressure relief valve (not shown) may communicate with the gas chamber side of the accumulator to provide an upper limit to the resistance and return forces that may be generated by the movable centering cylinder 39 acting on the centering shaft 32 and its lever 34 as described below. The gas chamber 66 of pressure accumulator 62 may be protected from moisture by suitable upstream air filters and/or dryers (not shown). On systems supplied by an air compressor, the discharge from the upper accumulator dump valve 70 may be routed to the compressor inlet filter (not shown) for providing a backflush function to keep this compressor filter clean.

Referring now to FIGS. 6-10, there is shown a specific structural arrangement of the components preferably incorporated in or attached directly to the centering unit 20. Centering unit 20 has a housing 35, preferable of cast metal, comprising an upper section 142 and a lower section 143, the upper section including four mounting lugs 27 for securing the housing to the vehicle frame rail 16 by means of four bolts 28. Upper housing 142 includes a pair of flanges 150, 150, and lower housing section 143 includes a pair of flanges 153, 153, these upper and lower flanges being secured together by a plurality of bolts 141 each threaded to a corresponding nut 144.

Secured to upper housing section 142 by means of the inlet fitting 46 is a stationary piston 42. For this purpose, fitting 46 has an elongated threaded shaft 48 to which stationary piston 42 is fixed by means of an assembly nut 52 so that the base 161 of the piston is held in a recess 163 and thereby abuts the top wall 165 of housing 35, to which base 161 is sealed by an O-ring 49. Fitting 46 has an axial fluid passage 47 communicating with the fluid pressure chamber 44, and an outer threaded bore 54 for receiving a threaded coupling that may connect either the gas line 41 of FIG. 4 or the liquid line 41' of FIG. 5.

Figure 7:
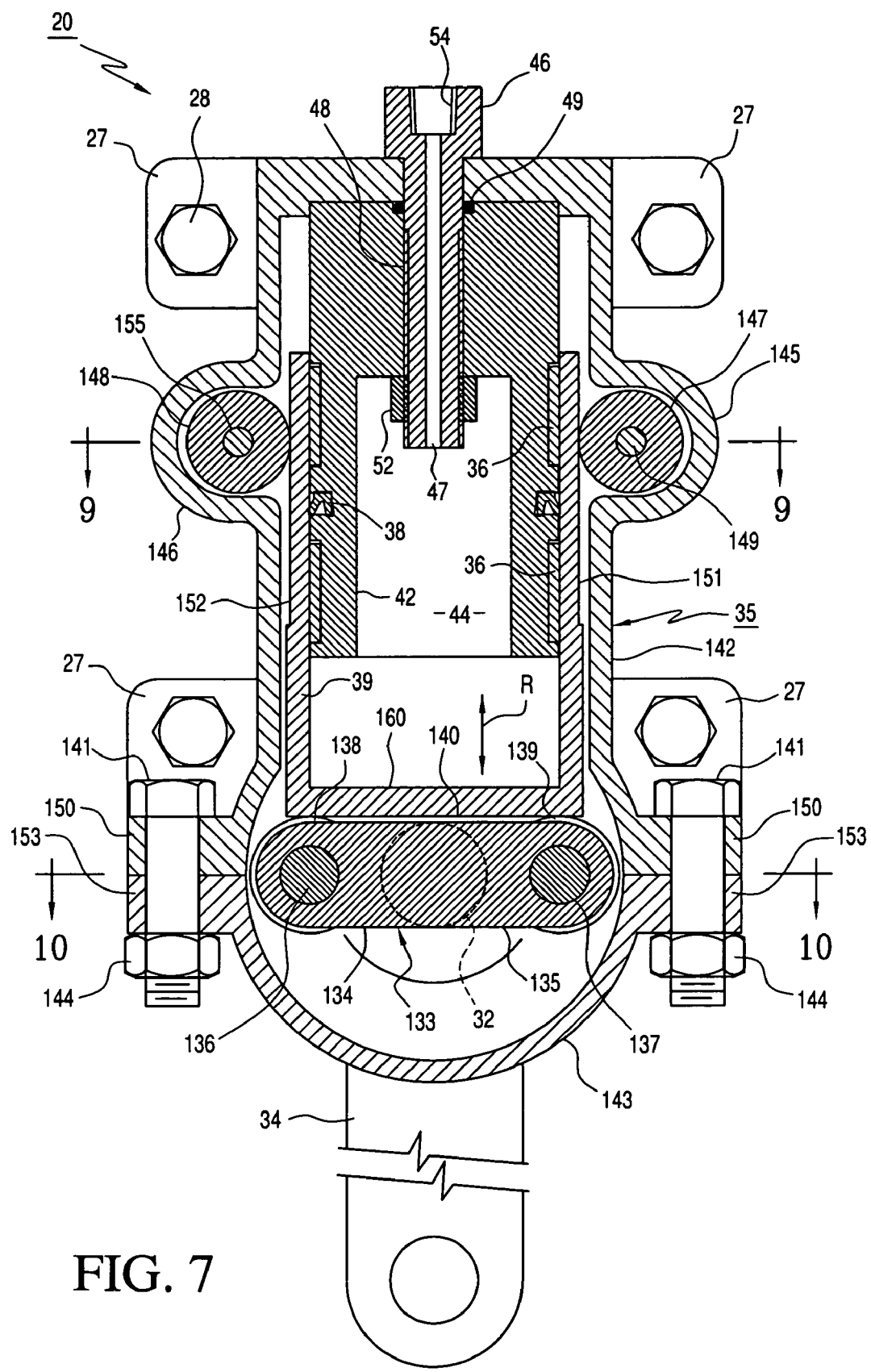
FIG. 7 is an enlarged elevational view of the centering unit in section taken along lines 7-7 of FIG. 6.

The centering cylinder 39 is arranged to receive the stationary piston 42 and to reciprocate relative thereto as indicated by the arrow R in FIG. 7. The cylinder 39 and the piston 42 are preferably cylindrical, and the upper house section 142 is generally cylinderal, although these components may have other cross-sectional shapes. To prevent leakage of pressurized fluid from centering chamber 44, the piston 42 includes two bushings 36, 36 and a U-cup seal 38. The reciprocation of centering cylinder 39 relative to stationary centering piston 42 is guided by a pair of alignment bearings 147 and 148, bearing 147 being carried by a pressed pin 149 and bearing 148 being carried by a pressed pin 155.

Figure 8:
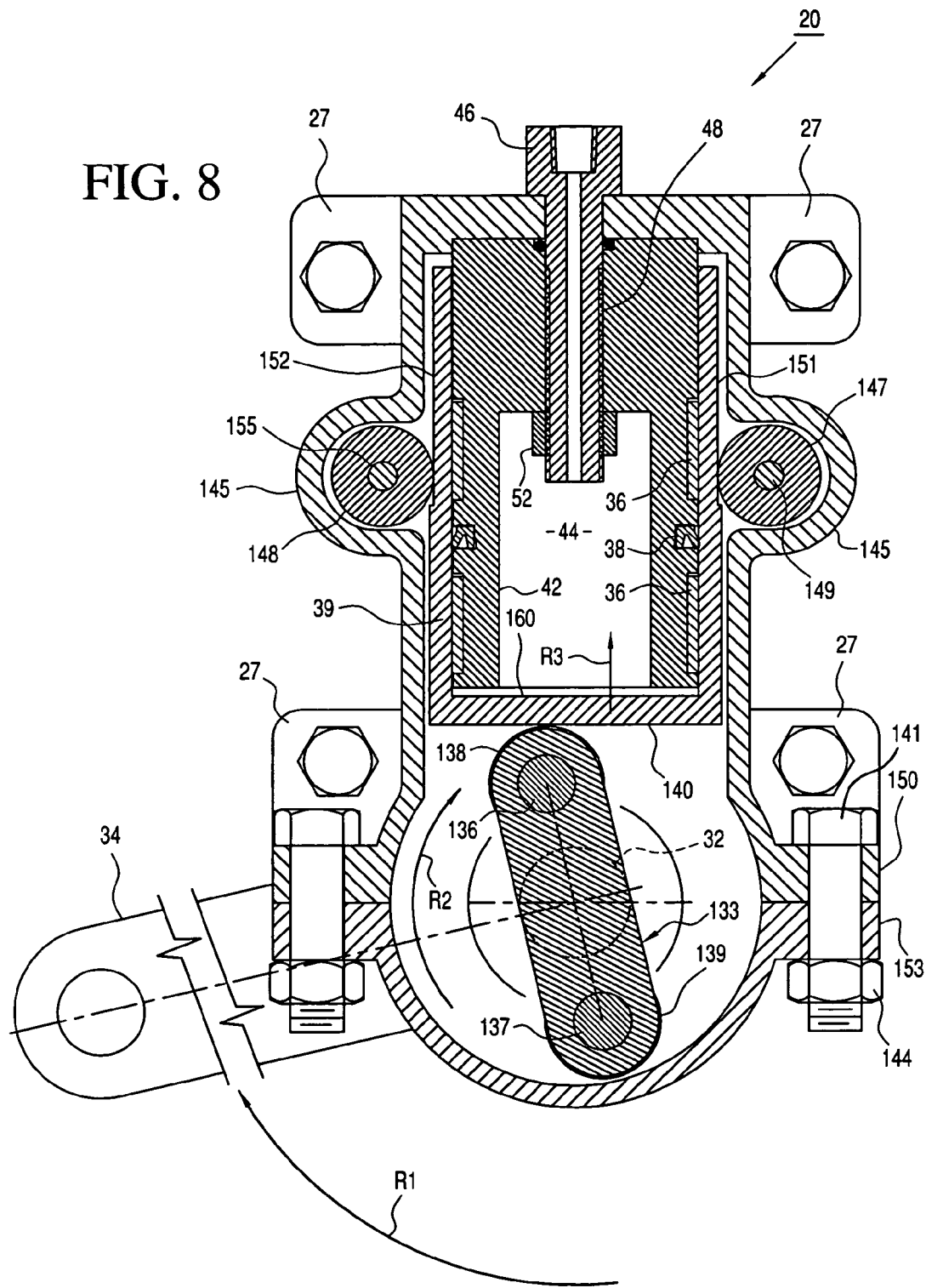
FIG. 8 is an enlarged elevational view of the centering unit in section similar to FIG. 7, but showing the components thereof in a moved position corresponding to a vehicle turning movement.
Figure 9:
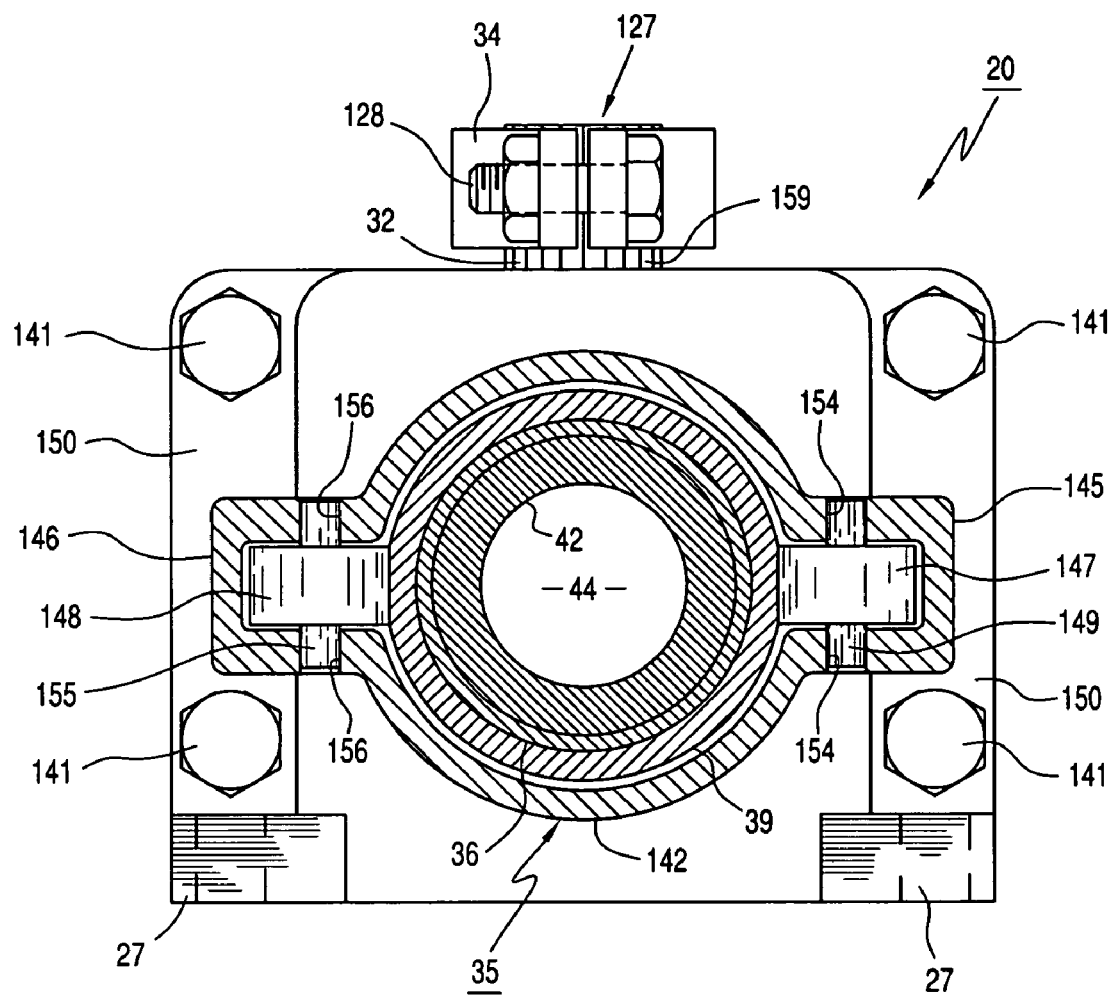
FIG. 9 is a partial sectional view of the centering unit taken along lines 9-9 of FIG. 7.
Figure 10:
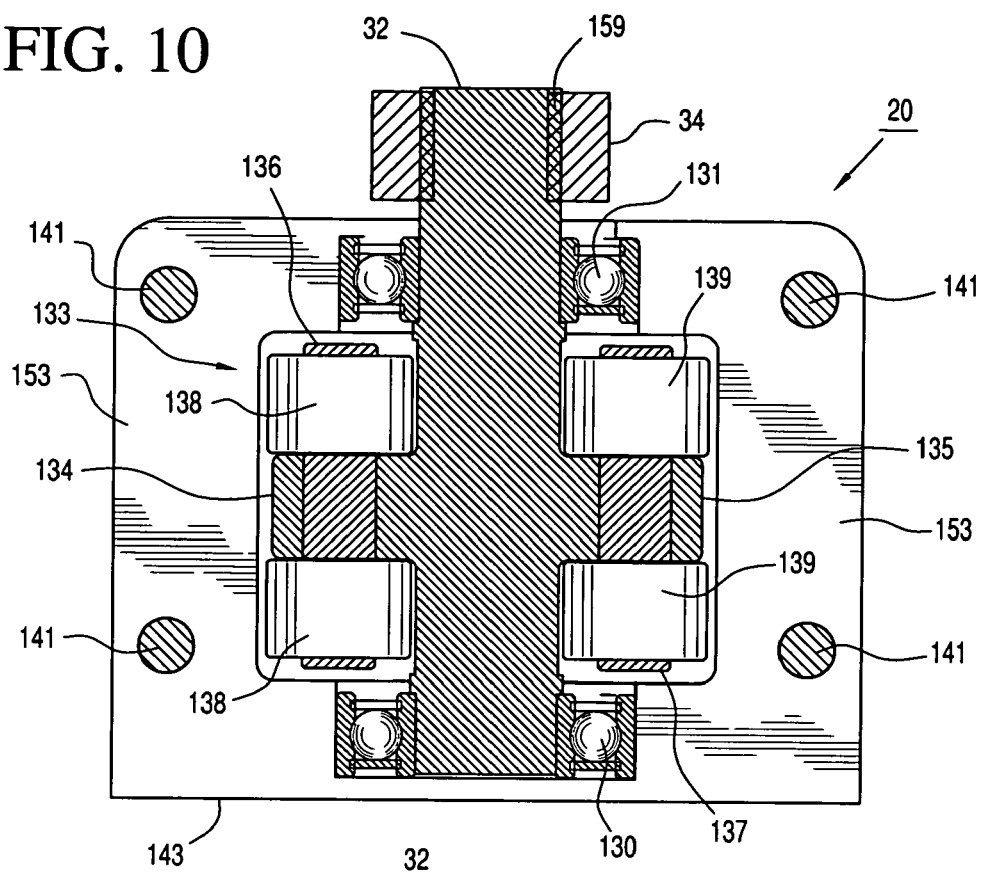
FIG. 10 is a partial sectional view of the centering unit taken along lines 10-10 of FIG. 7.
Figure 11:
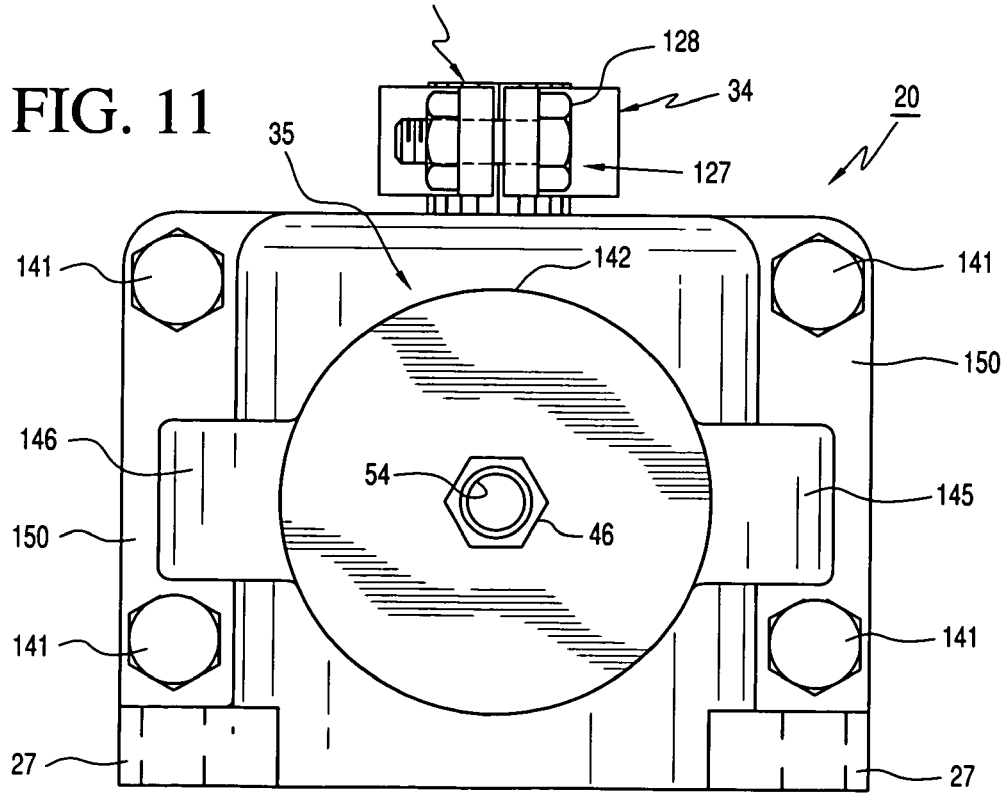
FIG. 11 is a top plan view of the centering unit of FIG. 4.
Figure 12:
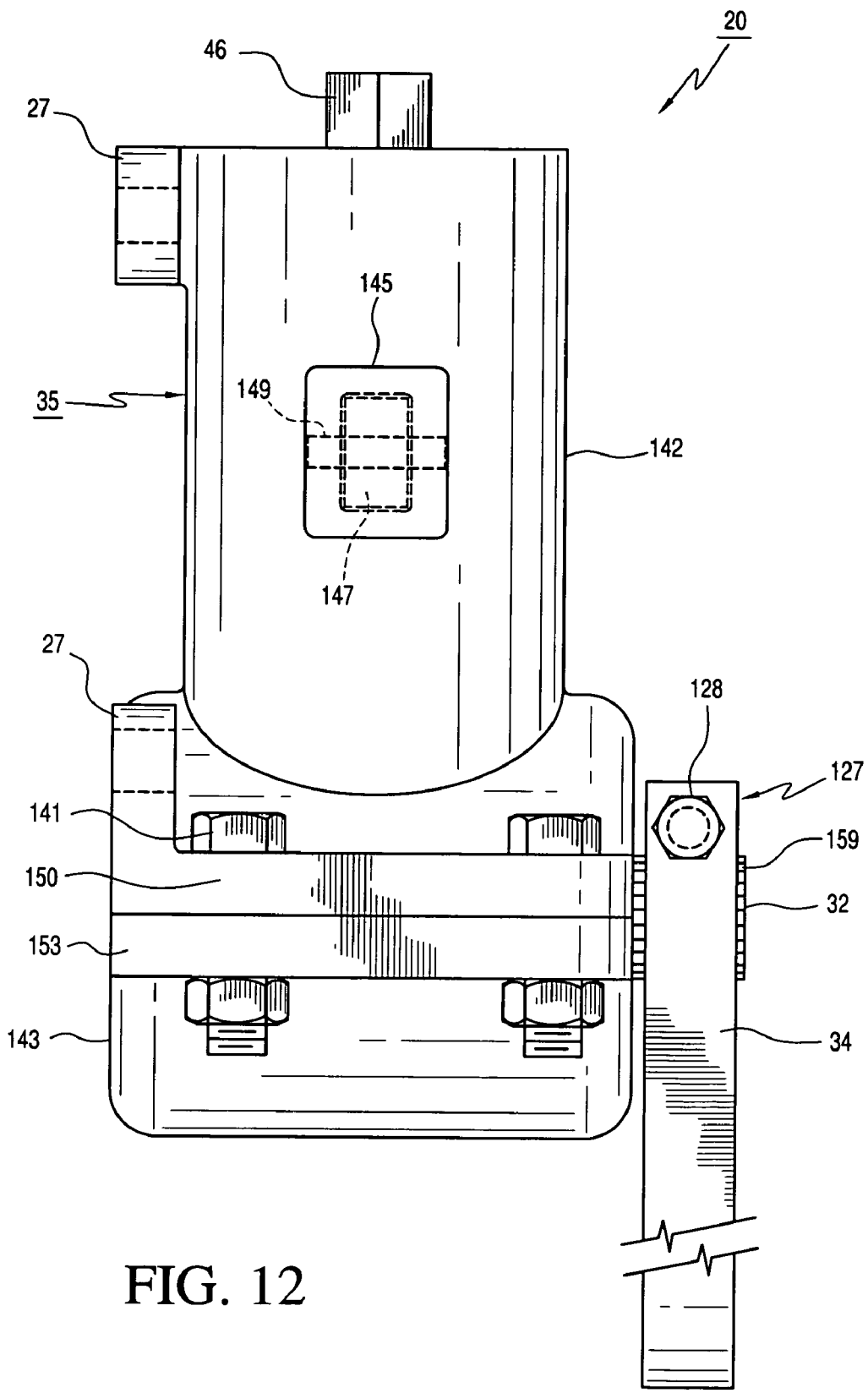
FIG. 12 is an elevational side view of the centering unit of FIG. 4.

The bearings 147 and 148 are arranged opposite to each other so as to engage flat surfaces 151 and 152, respectively, that serve as bearing raceways on opposite sides of cylinder 39 as shown best in FIGS. 7 and 8. Alignment bearings 147 and 148 are mounted for rotation within respective bearing housings 145 and 146, pressed pin 149 being rotatably mounted in journals 154, 154 of bearing housing 145, and pressed pin 155 being rotatably mounted in journals 156, 156 of bearing housing 146 as best shown in FIG. 9. Although the bearing housings 145 and 146 may be separate pieces bolted or otherwise secured to upper housing section 142, these bearing housings are preferably cast as an integral part of upper section 142 as shown in the drawings. The exterior shape of the bearing housings, as well as that of the centering unit housing 35 as a whole, is shown in FIGS. 11 and 12.

Reciprocation of the cylinder 39 is driven by a push mechanism having a plurality of roller bearings mounted for rotation on a support member generally designated 133. Support member 133 is affixed to centering shaft 32 for pivotable movement therewith as shaft 32 is pivoted by centering lever 34, which in turn pivots along with the Pitman arm 40 via the linkage provided by trimming unit 30. As may be seen best in FIG. 10, the support member 133 comprises opposing support arms 134 and 135, arm 134 carrying a pair of roller bearings 138, 138 on an axle pin 136, and arm 135 carrying a pair of roller bearings 139, 139 on an axle pin 137. As shown in FIG. 7, fluid pressure in chamber 44 causes both pairs of roller bearings to be continuously pressed against a bearing surface or raceway 140 along the outer surface of bottom wall 160 of centering cylinder 39, the resulting at rest pressing force thereby preventing any mechanical slack in the centering system.

Referring now to FIG. 8, as centering lever 34 tends to pivot in the direction R1, support member 133 tends to pivot in the direction R2 causing the bearing rollers 138, 138 to press harder than bearing rollers 139,139 against the bearing surface 140 along the bottom wall 160 of centering cylinder 39. When the pressing force provided by rollers 138, 138 is sufficient to overcome a resistance force provided by the fluid pressure in centering chamber 44, cylinder 39 travels through a compressive movement in the direction of arrow R3, centering lever 34 pivots in the direction R1, and support member 133 pivots in the direction R2. The directions R1, R2 and R3 in FIG. 8 illustrate a turning of the front steer wheels of a motor vehicle toward the left side of the vehicle for making a sharp left turn. Similarly, for a right turn of the vehicle, the pivotal movement of centering lever 34, centering shaft 32 and bearing support member 133 will be in the directions opposite to arrows R1 and R2 in FIG. 8, such that roller bearings 139, 139 will provide the necessary pressing force for causing cylinder 39 to have a compressive movement in the direct R3.

The centered steering position to be maintained by the centering unit 20 described above may be changed remotely by the trim unit 30 described below and shown in FIG. 13. Trim cylinder 77 contains the trim piston 116 that is secured to the inner end of the trim rod 31 by a snap ring 117. The cylinder 77 and piston 116 together define a pair of opposing trim chambers 170 and 171. For sealingly engaging trim cylinder 77, trim piston 116 carries a bushing 99 and two sets of dual circumferential seals 96, 96, each set comprising an outer seal of square cross section concentrically stacked on a more resilient seal of oval cross section to provide a close tolerance seal arrangement for substantially preventing any leakage of trim liquid past the trim piston. This precludes any significant drift of trim piston 116 away from its locked position for setting the on-center position of centering lever 34. A similar bushing 174 and circumferential seal 173 of close tolerance are also preferably provided on a trim piston 69, which is arranged for reciprocation within a liquid reservoir chamber 71 formed by piston 69 and the trim cylinder 73. Chamber 71 and its related passages and valves provide for liquid flow to and from trim chambers 170 and 171 when solenoid valve 24 is open.

Trim cylinder 77 and reservoir cylinder 73 are separated by an intermediate head 80 and these three components are contained within a cylindrical trim housing 76. Trimming chamber 170 is closed at its inner end by the intermediate head 80 and trim chamber 171 is closed at its outer end by the end head 87, which is secured in place by a cap 78 threaded or crimped to the housing 76. The trimming rod 31 passes through a rod journal 167 in end head 87 and an aperture 164 in cap 78, and the aperture 164 contains a set of multiple seals 166. An O-ring seal 168 is provided between head 87 and housing 76, and an O-ring seal 175 is provided between an opposite end head 79 and housing 76, head 79 being threaded or crimped to the housing 76 and preferably integrally connected to cylinder rod 23. Additional O-ring seals 176, 177, 178 and 179 are provided on the intermediate head 80 as indicated by the small circles in circumferential grooves within this head.

A one-way flow path from reservoir 71 to trim chamber 171 on one side of trim piston 116 is provided by an intermediate head passage 247, a check valve 249, a valve bore 248, a radial passage 254, an arcuate passage 212 and an end head port 218. Fluid is discharged from trim chamber 171 to trim reservoir 71 via a one-way flow path provided by end head port 215, arcuate passage 213, head passage 246, head bore 245, valve inlet passages 216 and 224, valve chamber 223, and valve outlet passages 211 and 217. Although not shown for purposes of clarity, corresponding one-way flow paths to and from trim chamber 170 are provided by corresponding intermediate head passages and ports and corresponding check valves and their bores, along with a connecting discharge passage providing access to head bore 245, valve inlet passages 216 and 224, valve chamber 223, and valve outlet passages 211 and 217. Inward and outward fluid flows through the foregoing one-way flow paths are prevented by the remotely actuated trim valve assembly 24 to prevent retraction or extension of trim rod 31 when the valve element of this assembly is in its closed position.

Arcuate passage 212 and 213 are formed by the radial spacing between the housing cylinder 76 and the trim cylinder 77, and are separated from each other by circumferentially sealed spacer elements (not shown) providing corresponding axial channels forming passages 212 and 213. Passage 246 contains check valve 244 and passage 247 contains check valve 249, and the similar head passages to and from trim chamber 170 contain corresponding check valves, to prevent reverse flow through these passages. Such reverse flow could otherwise occur while trim valve 24 is open. The outer ends of bores 245 and 248 containing valves 244 and 249 are closed off by plugs 220 and 250, respectively, so that the inner ends of these bores will direct flow to the appropriate head passages.

Figure 13:
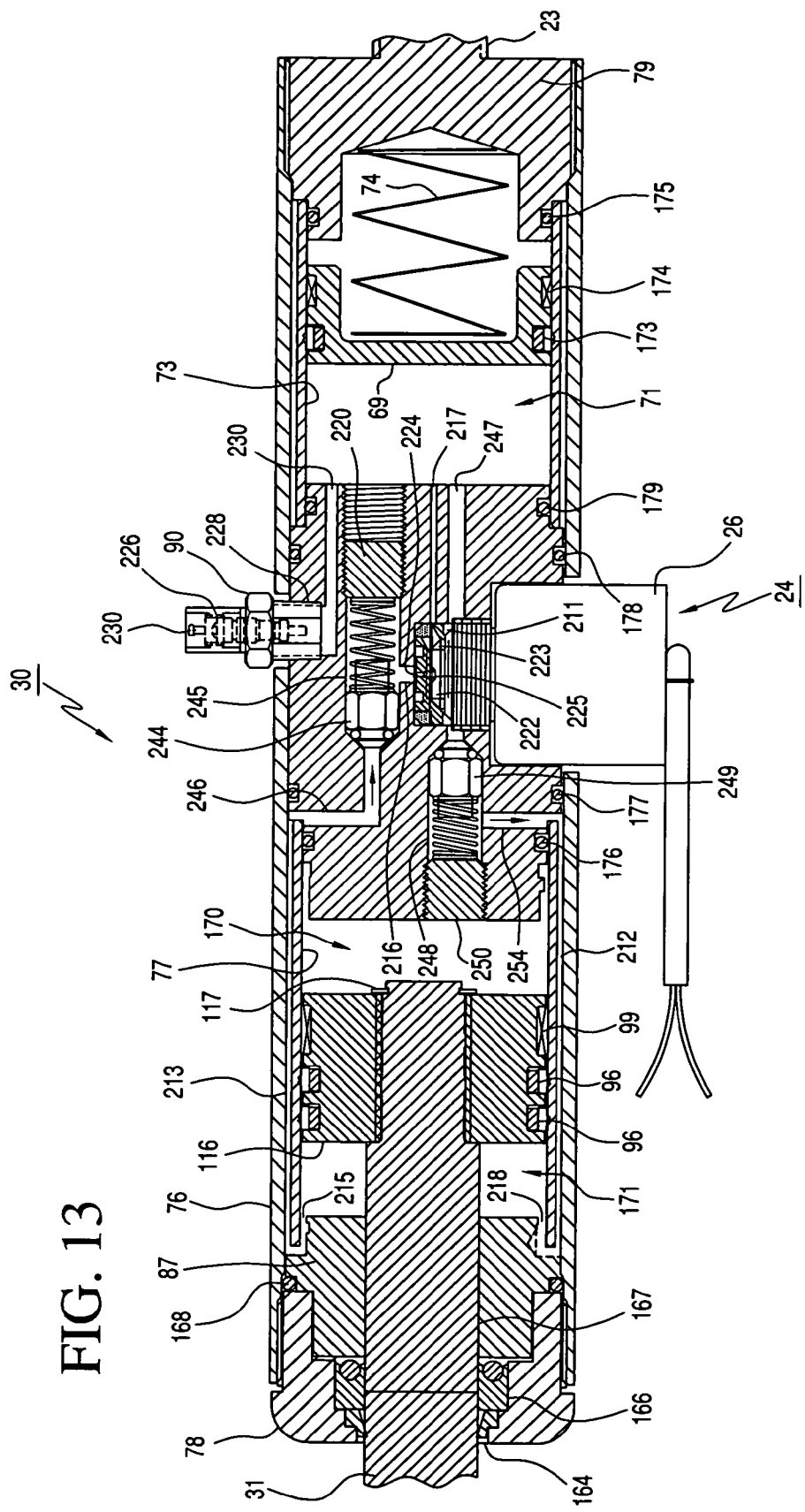
FIG. 13 is an enlarged partial sectional view of the trimming unit of FIG. 4.

With reference to the spacial orientation shown in FIG. 13, the vertical passage 216 leads to an inlet passage 224 passing through a trim valve seat 225. Seat 225 is normally closed by a spring-loaded valve element 222, but when element 222 is retracted by actuation of solenoid 26, trim fluid may flow into trim valve chamber 223 from passage 216 via seat passage 224. An outlet passage 211 through the mounting pedestal of valve assembly 24 discharges valve chamber 223 to reservoir chamber 71 via an outlet passage 217.

The fluid flow passages, valves and ports of the trimming unit 30 will now be described with reference to FIGS. 4, 5 and 13. Fluid may be supplied to or discharged from trim chambers 170 and 171 only when trim valve seat passage 224 is opened by the trim solenoid 36 retracting valve element 222 against the bias of its spring (not shown), this trim fluid being supplied to one trim chamber only while being discharged simultaneously from the other trim chamber. As shown in FIGS. 4 and 5, the remote solenoid 26 for actuating trim valve assembly 24 receives electrical power from the trim switch 85 via an electrical line 91. Trim fluid is supplied to one trim chamber or the other from the reservoir 71, which may be charged with pressurized liquid via a Schraeder type check valve 226 installed in the port fitting 90 within intermediate head bore 228. Such check valves have a stem 230 that may be depressed against spring tension to release fluid from chamber 71 so that it may be depressurized.

As previously indicated, liquid pressure chamber 71 may optionally be pressurized by substituting for valve 226 a coupling connecting port fitting 90 to a liquid line 55 from the pressurized liquid reservoir 64 of the accumulator 62 as shown in FIG. 5. In this alternative embodiment, the trim reservoir piston and its spring 74 may be eliminated so as to shorten the length of trim housing 76. However, the overall length of trimming unit 30 between ball joints 22 and 25 would remain the same.

When trim valve member 222 is lifted away from its seat 225 for allowing trim piston 116 to move outward relative to the housing 76, fluid is discharged from trim chamber 171 to trim reservoir 71 via end head port 215, arcuate passage 213, head passage 246, head bore 245, valve inlet passages 216 and 224, valve chamber 223, and valve outlet passages 211 and 217. Simultaneously, fluid flows from reservoir 71 into trim chamber 170 through passages and check valves (not shown) arranged in the same manner as those described below for fluid flow into trim chamber 171.

On the other hand, when trim valve member 222 is lifted away from its seat 225 for allowing trim piston 116 to move inward relative to the housing 76, fluid flows from reservoir 71 into trim chamber 171 through head passage 247, head bore 248, radial head passage 254, arcuate passage 212, and end head port 218. Simultaneously, fluid is discharged from trim chamber 170 into reservoir 71 through passages and check valves (not shown) arranged in the same manner as those described above for discharging trim fluid from trim chamber 171.

The centering chamber 44 of centering unit 20 may be pressurized by air or liquid to a pressure of, for example, 130 psig to provide a turning resistance. If the internal working area of bottom wall 160 of cylinder 39 is 3.5 square inches, a centering chamber pressure of 200-250 psig will provide a linear resistance force of about 500-550 pounds, as measured at the drag link 17 for opposing off-center movement of Pitman arm 40. Since many conventional steering system geometries provide a linear resistance force of about 15 to 20 pounds as measured at the drag link, the present invention may be used to increase the resistance and re-centering forces of these steering systems by a multiple of about 5 to about 30 or more, preferably about 10 to about 25. A resistance force of 500 pounds or more at the drag link is particularly effective in eliminating the adverse effects of crosswinds on large vehicles.

The tee 63 may optionally contain a flow restriction orifice 112. For a steer wheel control system using a liquid and having the foregoing characteristics, the flow restriction orifice may be sized at a diameter of about one-eighth inch. This passage size should not significantly affect off-center and return to center movements of Pitman arm 40 during normal steering and turning maneuvers in response to movements of the vehicle steering wheel. However, excessively rapid movement of the Pitman arm, such as may be caused by blowout of a steer wheel tire, is viscously dampened by the flow resistance of such an orifice so that the course of the vehicle may be safely controlled with relatively little additional steering effort by the driver. To illustrate this viscous dampening effect, it has been determined that initiation of an excessively rapid tie rod movement, as might be experienced during a tire blowout, can increase the pressure in the centering chamber 44 from 250 psig to about 400 psig, the latter applying a linear force of about 700 pounds to the drag link 17.

The remotely controlled trim valve assembly 30 operates as follows. If there is a roadway pull to the right, straight ahead travel will require a compensating steering force to the left from the steering wheel to move the centering cylinder 39, slightly toward stationary piston 42 in the same direction as arrow R3 in FIG. 8, which illustrates a much larger turning movement. Such slight movement of cylinder 39 relative to piston 42 creates a trimming force that causes trim cylinder 76 to be slightly biased relative to trim piston 116, thereby producing a differential pressure across trim piston 116 in trim cylinder 77. While holding the steering wheel in the position giving straight ahead travel, the trim button 85 is pushed momentarily to briefly actuate solenoid 26 and open trim valve 24, which allows fluid to be discharged from trim chamber 171 and supplied to trim chamber 170 such that trim cylinder housing 76 moves to the right in FIG. 13 relative to piston 116. This movement removes the differential pressure across trim piston 116 by equalizing the pressures in trim chambers 171 and 170. Fluid flowing out of chamber 171 follows the return flow path toward reservoir 71 as described above, and fluid supplied to trim chamber 170 follows a supply flow path similar to that described above for supplying fluid to trim chamber 171.

The movement of trim piston 116 in trim cylinder 77 causes centering cylinder 39 to be reseated in its rest position against both sets of roller bearings 138, 138, and 139, 139 as shown in FIG. 7. After its momentary actuation, the trim button 82 is then released to deactivate solenoid 26 and close trim valve 24, the valve element of which is held in its normally closed position by a compression spring (not shown). Trim piston 116 is thereby locked in its changed position corresponding to a new on-center position of Pitman arm 40 relative to centering lever 34. This new on-center position will then maintain the vehicle steering system in a newly centered condition, which provides straight ahead travel of the vehicle that is free from the previously experienced roadway pull to the right and will be maintained when the steering wheel is released.

In FIG. 13, the trim piston 116 is shown approximately in its center position within the trim cylinder 77. The trim piston preferably can move about one-half inch to about one inch to either side of its center position, i.e., the total stroke of the trim piston 116 is preferably in the range of about one inch to about two inches. The hydraulic fluid in this short trim cylinder is trapped on opposite sides of the trim piston by the trim valve 24 when it is closed, creating a hydraulic lock that holds the Pitman arm 40 in a selected on-center position. The average trim corrections may be on the order of a few one-thousandths of an inch. The tolerance for backlash (rebound) or drift in either direction of the trim piston in the trim cylinder is preferably held to no more than one-thousandth of an inch.

It is also important to recognize that the centering unit of the present invention engages the vehicle steering system at a location between the steer wheels and the reduction steering gear 33. As a result, spurious inputs from the steering wheel column and/or from the power steering unit are absorbed by the centering assembly 18 before these inputs can reach the steer wheels. Likewise, spurious forces transmitted from the roadway are immediately absorbed in the centering unit, rather than being transmitted through the entire steering assembly before encountering any stabilizing resistance from the steering wheel. As a result, the centering assembly 18 protects the interior components of the steering assembly from the wear caused by repeated oscillations between states of tension and compression.

A number of modifications and alterations are possible without departing from the scope of the present invention. For example, instead of having the trim valve and its related flow arrangement within intermediate head 80, there may be used a remote trim valve assembly as described in my Patent Publication No. 2005-0167939-A1. Another possible modification is that the important trimming feature of the invention may be achieved through drive means other than a hydraulic trimming piston. For example, movement of the trim rod 31 relative to cylinder rod 23 may be accomplished by controllably varying their positions with a small reversible electric motor mounted on a platform in place of the piston and cylinder assembly. Such trimming arrangements are described in my prior U.S. Pat. No. 4,418,931; No. 4,534,577; and No. 5,536,028. However, the hydraulic trimming arrangement shown in the drawings is preferably for its precision, simplicity and ease of installation on a wide variety of vehicles.

The invention may be used with various steering and/or tie rod arrangements and with steering systems that do not require a steering rod or a tie rod, e.g., those with only one steerable member such as the rudder of a ship or an airplane. The variable resistance and return force section of the invention can be used alone as a centering unit without the remote trimming unit disclosed herein. On the other hand, the remote trimming unit of the invention may be used with centering mechanisms of the prior art. Thus, the remotely operable trimming unit of the present invention can be combined with centering devices of known types to provide adjustment of the center position during vehicle operation.

Also, one or more of the resistance components or remote trimming components of the present invention may be combined with one or more such components as disclosed in my prior U.S. Pat. No. 4,410,193; No. 4,418,931; No. 4,534,577; No. 5,527,053; No. 5,536,028; No. 6,003,887; No. 6,065,561; No. 6,267,395; No. 6,422,582; No. 6,520,519; No. 6,520,520; No. 6,530,585; and No. 6,817,620, and in my Patent Publications No. 2005-0167939-A1 and No. 2004-0056443-A1. The entire contents of each of these patents and publications are expressly incorporated herein by reference. In addition, a number of other modifications to both the variable resistance components and to the trimming components specifically disclosed herein are possible without departing from the scope of the invention as defined by the claims set forth below.

What is claimed is:

1. An apparatus for positioning at least one steerable member connected to a steering shaft for movement to either side of a selected center position in response to rotational reciprocation of the steering shaft to either side of a centering position, said apparatus comprising resistance means for providing a holding force resisting steering forces tending to move said steerable member to either side of said center position, said resistance means comprising:

a centering shaft and means for connecting said centering shaft to the steering shaft for rotational reciprocation around a shaft axis, a rotational position of said centering shaft defining a neutral position corresponding to said selected center position;

a movable centering cylinder cooperating with a stationary centering piston to define a centering chamber, said centering cylinder being arranged to reciprocate between a rest position and an active position for compressing a fluid within said centering chamber;

actuating means for causing compressive movement of said centering cylinder away from said rest position in response to rotational movement of said centering shaft around said shaft axis to either side of said neutral position, said actuating means comprising first push means arranged to engage said centering cylinder so that rotation of said centering shaft away from said neutral position toward one side causes compressive movement of said centering cylinder, and second push means arranged to engage said centering cylinder so that rotation of said centering shaft away from said neutral position toward the other side causes compressive movement of said centering cylinder; and, centering fluid means for providing a pressurized fluid in said centering chamber so that fluid pressure against said centering cylinder provides said holding force by opposing movement of said steerable member toward either side of said selected center position and provides a return force continuously biasing said steerable member toward said selected center position during movement of said steerable member to either side of said selected center position, the rest position of centering cylinder corresponding to the neutral position of said centering shaft, and said fluid pressure causing said centering cylinder and said first and second push means to resist rotation of said centering shaft away from its neutral position;

wherein said first push means comprises a first push arm and said second push means comprises a second push arm, and wherein each of said push arms have a proximate end rigidly connected to said centering shaft.

2. An apparatus according to claim 1, wherein each of said push arms has a distal end carrying a corresponding bearing means arranged to engage an outer surface of a closed end of said centering cylinder.

3. An apparatus according to claim 2, wherein each of said corresponding bearing means comprises a roller bearing.

4. An apparatus according to claim 1, further comprising guide means for engaging surfaces on opposite sides of said centering cylinder to guide reciprocation thereof.

5. An apparatus according to claim 1, wherein said connecting means comprises trim means operable from a location remote from said resistance means for changing the centering position of said steering shaft to vary the selected center position of said steerable member.

6. An apparatus according to claim 5, wherein said trim means comprises linkage means connected between an arm connected to said steering shaft and a centering lever connected to said centering shaft, and wherein the length of said linkage means is remotely adjustable to change the centering position of said steering shaft.

7. An apparatus according to claim 6, wherein said linkage means comprises a trim piston cooperating with a trim cylinder to define a first trim chamber and a second trim chamber;
wherein said trim means further comprises trim fluid means for selectively providing a flow of a trim liquid to and from each of said trim chambers, said trim piston being movable relative to said trim cylinder to cause said flow and thereby change the centering position of said steering shaft;
and wherein said trim fluid means comprises:
trim fluid supply means for providing a pressurized trim liquid to said trim chambers,
trim valve means operable between a closed position for preventing trim liquid flow from each of said trim chambers and an open position for allowing said trim piston to move relative to said trim cylinder, said trim piston movement causing trim liquid to flow into one of said trim chambers and trim liquid to flow out of the other of said trim chambers,
and operating means activatable from said remote location for operating said trim valve means between said closed and open positions.

8. An apparatus according to claim 1, wherein said centering fluid is a centering liquid, and wherein said centering fluid means comprises:
accumulator means having a centering fluid reservoir for holding a supply of pressurized centering liquid, and means for pressurizing said centering liquid supply;
and centering conduit means for providing a flow of said pressurized centering liquid between said reservoir and said centering chamber.

9. An apparatus according to claim 8, wherein said accumulator means comprises a housing wall and an interior wall cooperating with said housing wall to define said centering fluid reservoir; wherein the interior wall of said accumulator means comprises a flexible diaphragm defining a gas chamber; and wherein said pressurizing means comprises means for pressurizing said gas chamber with a gas to cause said diaphragm to pressurize the liquid in said reservoir, and means for controllably varying the pressure of said gas so as to vary said liquid pressure.

10. An apparatus according to claim 1 for a vehicle having a power steering unit for providing steering power to said steerable member, said apparatus further comprising means for preventing said fluid pressure in the absence of steering power from said power steering unit.

11. An apparatus according to claim 1, wherein said centering fluid is a centering gas, and wherein said centering fluid means comprises:
gas source means for providing a source of pressurized gas and comprising a centering fluid reservoir for holding a supply of said pressurized centering gas,
and centering conduit means for providing a flow of said centering gas from said reservoir to said centering chamber.

12. An apparatus according to claim 11, wherein said gas source means further comprises means for controllably varying the pressure of said gas in said centering chamber so as to vary the holding force provided by said centering cylinder.

13. An apparatus according to claim 1, for positioning a steerable wheel of a vehicle, wherein said centering fluid means comprises a source of centering fluid, means for supplying said fluid from said source to said centering chamber at a fluid pressure, and control means for adjusting the amount of said fluid pressure to vary said resistance and return forces, said control means comprising sensor means for sensing a speed of said vehicle, and means for adjusting the amount of said pressure in response to said vehicle speed.

14. An apparatus according to claim 1, wherein said centering fluid means includes means for changing said holding force.

15. An apparatus according to claim 1, wherein each of said push means engage a corresponding surface portion of said centering cylinder with an amount of contact pressure dependant upon the fluid pressure in said centering chamber, and wherein said fluid means includes adjusting means for adjusting said fluid pressure to change the amount of said contact pressure and thereby change said holding force.

16. An apparatus for positioning at least one steerable member connected to a steering shaft for movement to either side of a selected center position in response to rotational reciprocation of the steering shaft to either side of a centering position, said apparatus comprising resistance means for providing a holding force resisting steering forces tending to move said steerable member to either side of said center position, said resistance means comprising:
a centering shaft and means for connecting said centering shaft to the steering shaft for rotational reciprocation around a shaft axis, a rotational position of said centering shaft defining a neutral position corresponding to said selected center position;
a movable centering cylinder cooperating with a stationary centering piston to define a centering chamber, said centering cylinder being arranged to reciprocate between a rest position and an active position for compressing a fluid within said centering chamber;
actuating means for causing compressive movement of said centering cylinder away from said rest position in response to rotational movement of said centering shaft around said shaft axis to either side of said neutral position, said actuating means comprising first push means arranged to engage said centering cylinder so that rotation of said centering shaft away from said neutral position toward one side causes compressive movement of said centering cylinder, and second push means arranged to engage said centering cylinder so that rotation of said centering shaft away from said neutral position toward the other side causes compressive movement of said centering cylinder;
centering fluid means for providing a pressurized fluid in said centering chamber so that fluid pressure against said centering cylinder provides said holding force by opposing movement of said steerable member toward either side of said selected center position and provides a return force continuously biasing said steerable member toward said selected center position during movement of said steerable member to either side of said selected center position, the rest position of centering cylinder corresponding to the neutral position of said centering shaft, and said fluid pressure causing said centering cylinder and said first and second push means to resist rotation of said centering shaft away from its neutral position; and, guide means for engaging surfaces on opposite sides of said centering cylinder to guide reciprocation thereof.

17. An apparatus according to claim 16, wherein said guide means comprises a pair of bearing members each arranged to engage a corresponding bearing surface on one of said opposite cylinder sides, and support means for supporting each of said bearing members for rotation along its corresponding bearing surface.

18. An apparatus for positioning at least one steerable member connected to a steering shaft for movement to either side of a selected center position in response to rotational reciprocation of the steering shaft to either side of a centering position, said apparatus comprising resistance means for providing a holding force resisting steering forces tending to move said steerable member to either side of said center position, said resistance means comprising:

a centering shaft and means for connecting said centering shaft to the steering shaft for rotational reciprocation around a shaft axis, a rotational position of said centering shaft defining a neutral position corresponding to said selected center position;

a movable centering cylinder cooperating with a stationary centering piston to define a centering chamber, said centering cylinder being arranged to reciprocate between a rest position and an active position for compressing a fluid within said centering chamber;

actuating means for causing compressive movement of said centering cylinder away from said rest position in response to rotational movement of said centering shaft around said shaft axis to either side of said neutral position, said actuating means comprising first push means arranged to engage said centering cylinder so that rotation of said centering shaft away from said neutral position toward one side causes compressive movement of said centering cylinder, and second push means arranged to engage said centering cylinder so that rotation of said centering shaft away from said neutral position toward the other side causes compressive movement of said centering cylinder; and, centering fluid means for providing a pressurized fluid in said centering chamber so that fluid pressure against said centering cylinder provides said holding force by opposing movement of said steerable member toward either side of said selected center position and provides a return force continuously biasing said steerable member toward said selected center position during movement of said steerable member to either side of said selected center position, the rest position of centering cylinder corresponding to the neutral position of said centering shaft, and said fluid pressure causing said centering cylinder and said first and second push means to resist rotation of said centering shaft away from its neutral position;

wherein said connecting means comprises trim means operable from a location remote from said resistance means for changing the centering position of said steering shaft to vary the selected center position of said steerable member, and wherein said trim means comprises linkage means connected between an arm connected to said steering shaft and a centering lever connected to said centering shaft, and wherein the length of said linkage means is remotely adjustable to change the centering position of said steering shaft.

19. An apparatus according to claim 18, wherein said linkage means comprises a trim piston cooperating with a trim cylinder to define a first trim chamber and a second trim chamber;

and wherein said trim means further comprises trim fluid means for selectively providing a flow of a trim liquid to and from each of said trim chambers, said trim piston being movable relative to said trim cylinder to cause said flow and thereby change the centering position of said steering shaft.

20. An apparatus according to claim 19, wherein said trim fluid means comprises:

trim fluid supply means for providing a pressurized trim liquid to said trim chambers, trim valve means operable between a closed position for preventing trim liquid flow from each of said trim chambers and an open position for allowing said trim piston to move relative to said trim cylinder, said trim piston movement causing trim liquid to flow into one of said trim chambers and trim liquid to flow out of the other of said trim chambers, and operating means activatable from said remote location for operating said trim valve means between said closed and open positions.

21. An apparatus according to claim 20, wherein said supply means comprises:

an accumulator means having a trim fluid reservoir for holding a supply of said trim liquid, and means for pressurizing said trim liquid supply, first conduit means for providing fluid communication between said trim reservoir and said first trim chamber, second conduit means for providing fluid communication between said trim reservoir and said second trim chamber;

and wherein said trim valve means comprises:

a valve member arranged for reciprocating movement between a closing position for closing a valve port and an opening position for opening said valve port, said operating means being connected to said valve member to provide said reciprocating movement.

22. An apparatus according to claim 21, wherein said accumulator means further comprises a housing wall and an interior wall cooperating with said housing wall to define a trim fluid reservoir, wherein the interior wall of said accumulator means comprises a flexible diaphragm defining a gas chamber; and wherein said apparatus further comprises means for pressurizing said gas chamber with a gas to cause said diaphragm to pressurize the liquid in said reservoir.

23. An apparatus according to claim 21, wherein said trim reservoir comprises a piston chamber, and said pressurizing means comprises a piston arranged to reciprocate in said piston chamber and biasing means for biasing said piston to pressurize the liquid in said reservoir.

\* \* \* \* \*